United States Patent [19]

Forney et al.

[11] Patent Number: 5,042,546
[45] Date of Patent: Aug. 27, 1991

[54] RADIAL PLY PNEUMATIC TIRE WITH REVERSE CURVATURE CARCASS PLY

[75] Inventors: Joseph M. Forney, Akron; Arthur A. Goldstein, Mayfield Village; Robert P. Loser, Akron, all of Ohio

[73] Assignee: The Goodyear Tire & Rubber Company, Akron, Ohio

[21] Appl. No.: 384,119

[22] Filed: Jul. 24, 1989

Related U.S. Application Data

[63] Continuation of Ser. No. 121,569, Nov. 16, 1987, abandoned.

[51] Int. Cl.$^5$ .......................... B60C 9/00; B60C 9/18; B60C 3/02; B60C 9/02
[52] U.S. Cl. ................................. 152/454; 152/526; 152/532; 152/538; 152/548
[58] Field of Search ............... 152/548, 532, 454, 538, 152/526

[56] References Cited

U.S. PATENT DOCUMENTS

| 1,678,211 | 7/1928 | Davidson . | |
| 1,862,269 | 6/1932 | Johnson . | |
| 3,486,547 | 12/1969 | Powers . | |
| 3,717,191 | 2/1973 | Harrington | 152/532 X |
| 3,739,829 | 6/1973 | Powell et al. . | |
| 3,841,375 | 10/1974 | Edwards . | |
| 3,851,691 | 12/1974 | French . | |
| 3,857,429 | 12/1974 | Edwards . | |
| 3,977,455 | 8/1976 | Swales et al. | 152/532 |
| 4,091,856 | 5/1978 | Jackson . | |
| 4,284,116 | 8/1981 | Sato et al. . | |
| 4,345,634 | 8/1982 | Giron . | |
| 4,564,055 | 1/1986 | Ghilardi . | |
| 4,662,416 | 5/1987 | Yagi et al. | 152/209 R |

FOREIGN PATENT DOCUMENTS

| 51422/85 | 12/1985 | Australia . |
| 0016686 | 1/1980 | European Pat. Off. . |
| 1191703 | 4/1965 | Fed. Rep. of Germany . |
| 1680466 | 9/1971 | Fed. Rep. of Germany . |
| 7623041 | 11/1976 | Fed. Rep. of Germany . |
| 2734586 | 2/1979 | Fed. Rep. of Germany . |
| 1290231 | 3/1962 | France . |
| 1327195 | 7/1973 | United Kingdom . |
| 2002699 | 2/1979 | United Kingdom . |
| 2015946 | 9/1979 | United Kingdom . |
| 1565098 | 4/1980 | United Kingdom . |
| 2070526 | 9/1981 | United Kingdom . |

OTHER PUBLICATIONS

*Mathematics Underlying the Design of Pneumatic Tires*, John F. Purdy: Akron, Ohio, Hiney Printing Co., 1963; pp. 1–49.

*Primary Examiner*—Michael W. Ball
*Assistant Examiner*—Adrienne C. Johnstone
*Attorney, Agent, or Firm*—L. R. Drayer; David L. King

[57] ABSTRACT

A radial-ply pneumatic tire carcass has a reverse curvature, an outwardly concave shape, centered about the tire's equatorial plane. A wedge of elastomeric material is positioned above or below the belt structure of the tire. If positioned above the belt structure, the wedge is used with a carcass cord angle in the range from 65° to 80°. This carcass structure also may be used when the wedge is positioned between the belt structure and carcass. The tire has an aspect ratio less than 75%, but 40% to 65% is preferred. The wedge has a shape on its radially inner side that is similar to a low amplitude cosine function. Particularly when the wedge is above the belt structure (providing both it and the belt structure with a reverse curvature), the belt cord angle is less than a "critical angle" of about 25°. The invention can provide a radial-ply belted tire which has "natural shape" in the portion of the radial carcass underlying the belt structure, but the "natural shape" is for those low cord angles used in the belt structure.

13 Claims, 14 Drawing Sheets

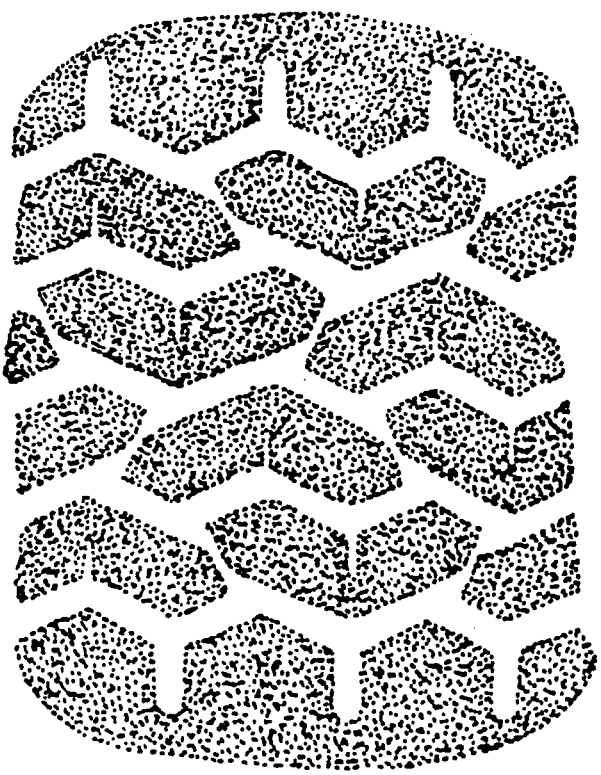
FIG.9 AFTER BREAK-IN
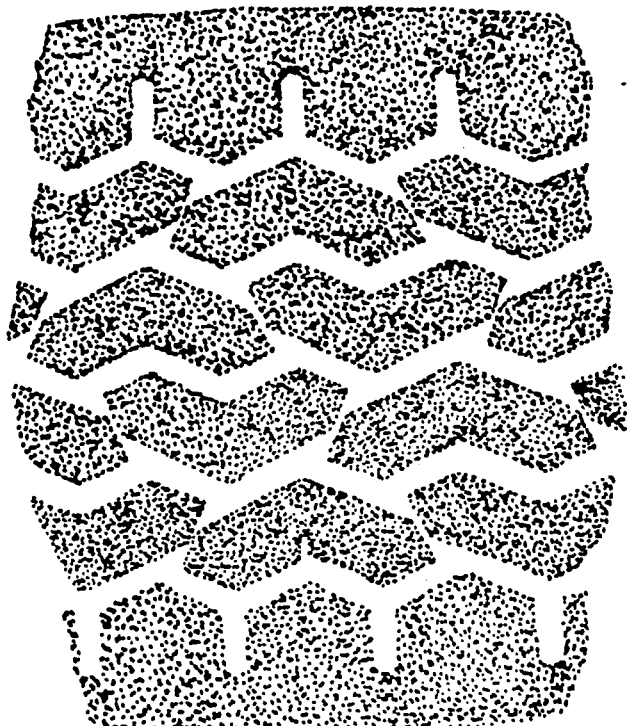
FIG.8 NEW TIRE

WEDGE INSERT 360 (DIMENSION "A" AS IN FIG.10)

AFTER BREAK-IN

WEDGE INSERT 360 (DIMENSION "A" AS IN CONTROL TIRE)

AFTER BREAK-IN

PRIOR ART CONTROL TIRE

AFTER BREAK-IN

FIG.15 *PRIOR ART*

RADIAL PLY PNEUMATIC TIRE WITH REVERSE CURVATURE CARCASS PLY

This is a continuation of application Ser. No. 07/121,569 filed on Nov. 16, 1987, now abandoned.

This invention relates to a radial-ply pneumatic tire having a carcass ply that has a reverse curvature, that is, a curvature that in the radial direction, and centered about the tire's equatorial plane, is inwardly convex or outwardly concave. The reverse curvature occurs between two inflection points in the carcass ply or plies equally spaced from the tire's equatorial plane. The carcass ply or plies have their maximum radial dimensions at two spaced points axially outward as of the respective inflection points and have a lesser radial dimension at the equatorial plane. As a result, the curvature of the carcass in the tire's crown area may resemble a low-amplitude cosine waveform.

The invention reduces stresses in the pneumatic tire's belt-edge areas and provides significantly greater uniformity of displacement (growth) in the tire's radial dimensions as a result of its inflation from atmospheric or low pressure to a normal pressure accommodating its normal load. In a preferred aspect of the invention, the broken-in radial tire will have increases in all of its exterior dimensions (except those restrained by the rim on which it is mounted) upon normal inflation of the tire.

Pneumatic tires experience change in their dimensions when mounted on a wheel and rim and inflated from atmospheric pressure (or the low pressure required to maintain its beads firmly seated on the rim with slight tensile stress on the carcass cords) to normal inflation pressure. This dimensional change upon inflation from atmospheric pressure to normal tire pressure in radial-ply pneumatic tires typically has nonuniform characteristics. Typical of the tread surface is an increase in, or displacement of, its radial dimensions as measured from the tire's axis of rotation. These increases in the radial dimensions tend to be nonuniform as the radial measurements are made progressively from the tire's equatorial plane to the lateral edges of its tread. The radial-ply tire undergoes a greater percentage increase in its radial dimensions as measurements proceed toward the tread's lateral edges. This excessive growth in the shoulder or tread-edge areas upon inflation contributes to stress concentrations in the edges of the belt plies underlying the tire tread and also can lead to rapid and uneven tread wear during normal tire use. Footprints of tires having this excessive growth characteristic tend to be of "butterfly" shape due to greater unit pressures at the tread shoulders under normal tire loads. This footprint characteristic tends to become worse after the tire has been broken-in by use and is more pronounced and difficult to correct as a function of decreasing aspect ratio.

Various attempts have been made to overcome this problem typical of radial-ply tires. For example, Australian patent application no. 51422/85 filed Dec. 18, 1985 in the name of Bridgestone Corporation and entitled "Pneumatic Radial Tire" discloses a tire having belt plies that are concave outwardly and away from the oppositely shaped or convex carcass portion. On the other hand, U.S. Pat. No. 4,564,055 issued Jan. 14, 1986 to G. Ghilardi entitled "Molding Profile of Tire Carcasses" discloses a radial-ply tire having a belt structure and carcass plies with concave areas spaced from the tire's equatorial plane. The concave shape to the tire's components is intended to improve tire road behavior by providing more equal distribution of the tire stresses in the region of the staggered edges of the belt plies. (Care should be taken to avoid confusion with respect to the use of the words "concave" and convex" in these references.)

The present invention simultaneously solves both the nonuniform growth and stress-distribution problems addressed by the references cited above, while at the same time allowing this dual benefit to be obtained in a pneumatic tire having a radial-ply structure that can be of simpler design than any of those contemplated in the references. This is accomplished through pursuit of an avenue the general direction of which the Ghilardi patent in its columns 1 and 2 states had not been fruitful in the past.

In an attempt to solve the problem of a "butterfly" tire footprint, the assignee of the present invention manufactured and sold a size 255/70R22.5 low-profile radial truck tire. This tire has its tread and undertread rubber configured in a manner that causes a reverse curvature (outwardly concave) shape to be formed in both the belt structure and the underlying steel carcass ply of 90° cord angle. First manufactured in 1985, the tire has construction features similar to those depicted in the prior art tire shown in FIG. 1. It would be proper to characterize this tire as having a "wedge" of elastomeric material or "means", positioned radially outwardly of the belt structure, for causing both the underlying belt structure and carcass ply to have a reverse curvature centered about the equatorial plane of the tire.

German Design Patent ("Gebrauchsmuster") GM 76 23 041 discloses a radial-ply pneumatic truck tire having a radial carcass ply, a belt structure radially outward of and circumferentially surrounding the carcass to provide circumferential restriction of the carcass shape beneath the belt structure, and a tire tread. The tire has elastomeric means imparting a reverse curvature to the single radial carcass ply. The elastomeric means is positioned between the carcass ply and another radial ply forming one of the layers in a belt structure. The purpose of the elastomeric means in this high-aspect-ratio truck tire is to "cause a stiffening in the middle of the tread both in radial and axial directions, whereby, the resistance to abrasion is improved and a relatively lower average temperature is reached during operation."

German Patent 1,680,466 published Sept. 16, 1971 also discloses a tire having elastomeric means imparting a reverse curvature to its radial carcass ply, but for a much different purpose. The tire described in this patent has a circumferentially inextensible and removable tread ring held in place when the radial carcass is inflated toward its natural shape. The patent states that the ratio H/C (aspect ratio) is best when it does not exceed 0.92, but that for various reasons it is "impossible to reach a value for H/C smaller than 0.92, and hence to assure the attachment of the tread ring under all working conditions". The apparent purpose of the elastomeric means is to allow the inflated carcass to expand radially outwardly to restrain the removable tread ring.

In accordance with the invention, which applies only to tires having an aspect ratio less than or equal to 75% and a tread width in the range from 65% to 80% of the tire's maximum section width, a radial tire for use on paved road surfaces has elastomeric means for imparting a reverse curvature to the tire's radial carcass (and also to its belt structure where the tire has at least two radial plies with right and left cord angles in the range from 65° to 80°).

The reverse curvature is in a region between two points in the tire profile centered about and on opposite sides of the equatorial plane of the tire. The tire carcass ply or plies at the equatorial plane have a radial dimension from the tire's axis of rotation that is less than the radii at the aforementioned two points, which are located at respective maximum radial dimensions of the carcass ply on opposite sides of the equatorial plane. The reverse curvature results in the presence of inflection points in the region of such curvature. The inflection points also are equally spaced from the equatorial plane. The points of maximum radial dimension to the carcass ply or plies are respectively located axially inwardly of both the lateral edges of the belt structure and the centers of the annular tensile members in the beads of the tire when mounted on its design rim and normally inflated. Dimensions between the carcass and the belt structure continually decrease as a function of axial distance from the equatorial plane in the region between the two points in the tire profile.

In accordance with another aspect of the invention, the radial-ply pneumatic tire is configured with one or two "radial" plies as its carcass; these plies have cord angles respectively directed left and right at angles in the range from 65° to 80°. This construction is particularly suitable for passenger and light-truck vehicles and is used with a belt structure having two or more plies. A wedge of elastomeric material is used to impart a reverse curvature to the carcass, the reverse curvature making the carcass profile concave outwardly in a region centered about the equatorial plane. The elastomeric means for causing the reverse curvature can be an integral part of the tread or undertread material or can be a suitable member positioned between the belt structure and the carcass plies. If an elastomeric wedge is positioned above the belt structure, the belt structure also will have a reverse curvature centered about the equatorial plane.

The tire when mounted on its design rim and undeflected undergoes uniform growth in the radial dimensions as measured from the axis of rotation of the tread surface of the tire when its inflation pressure is increased from atmospheric pressure to normal pressure. The radial displacement laterally across the tread surface is uniform within plus or minus 25% of the radial displacement of the tread surface at the equatorial plane.

The combination of the reverse curvature in the low-profile (75% or less aspect ratio) tire with the 65° to 80° "radial" carcass cords provides the opportunity to achieve a tire design having reduced belt-edge and bead-area stresses, uniform growth characteristics upon inflation, and simplified bead and lower sidewall construction due to the cord angles in the carcass plies. A tire of preferred form according to this aspect of the invention will have textile cords in its carcass plies, will have steel or aromatic polyamide (aramid) cord in its belt plies with cord angles less than or equal to 25°, and will have an aspect ratio of 65% or less.

The invention may be better understood by reference to the detailed description which follows and to the drawings, in which:

FIG. 8 is a footprint of the tire of FIG. 4 prior to break-in of such tire.

FIG. 9 is similar to FIG. 8 but illustrates the footprint after break-in of the tire.

Figure 15:
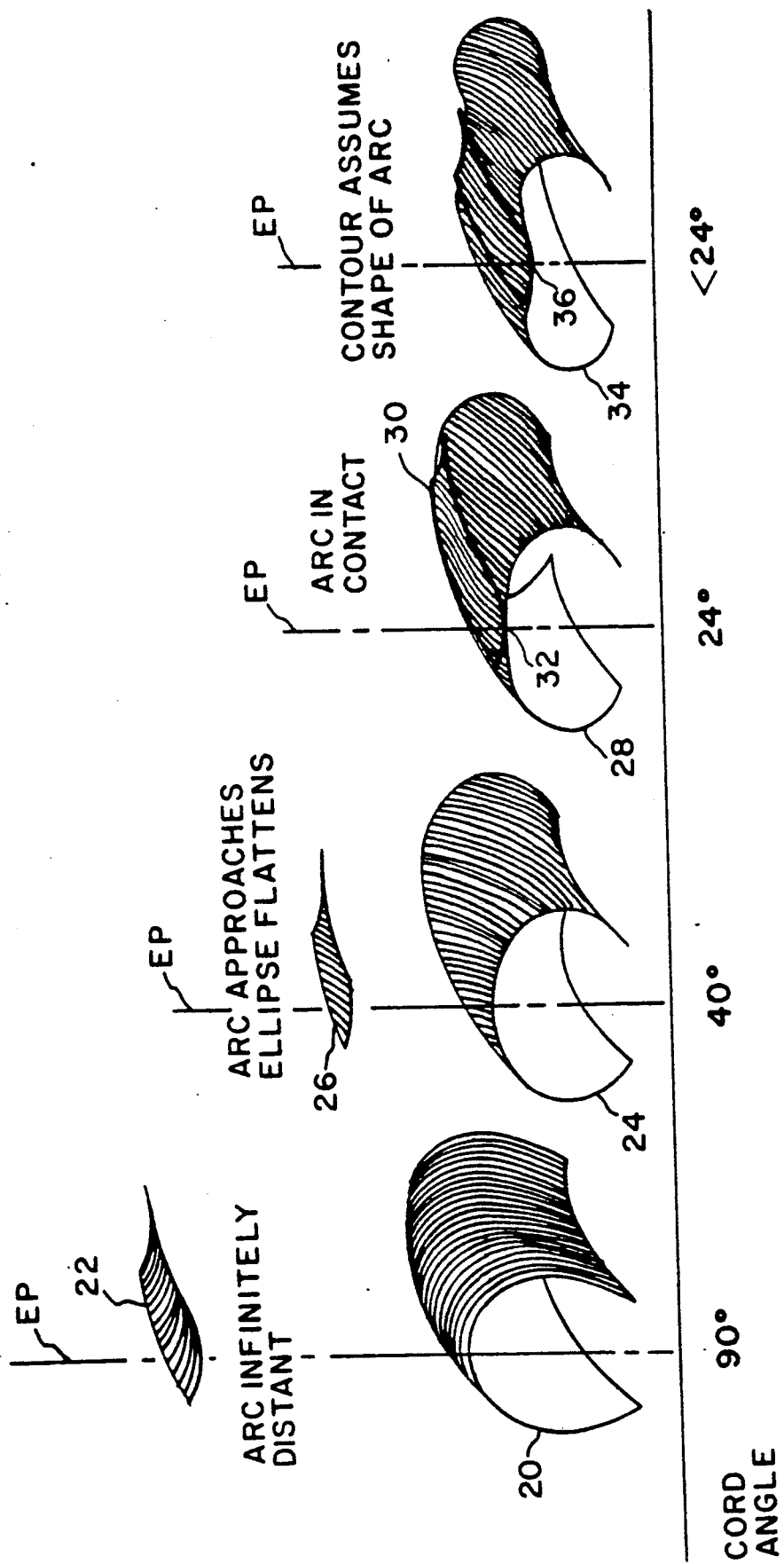

FIG. 15 further illustrates a family of carcass contours for various cord angles down to values less than a critical angle of approximately 24°, the carcass contours again being for a tire unrestricted by a belt structure.

Figure 4:
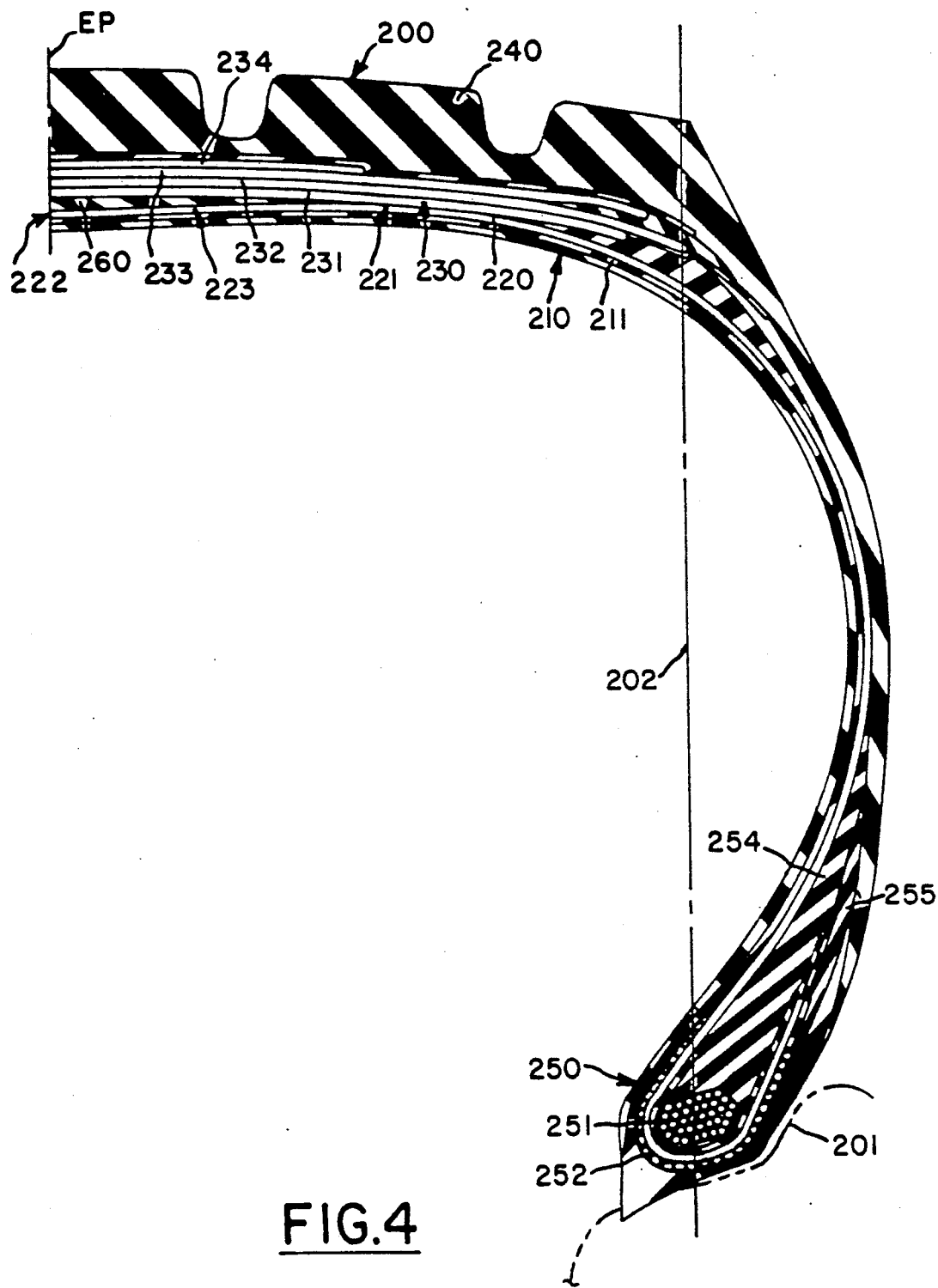
FIG. 4 is a reduced-scale, half-section profile of a radial-ply pneumatic tire of truck "super-single" size 16.5R22.5 and 65% aspect ratio constructed in accordance with a first aspect of the invention.
Figure 16:
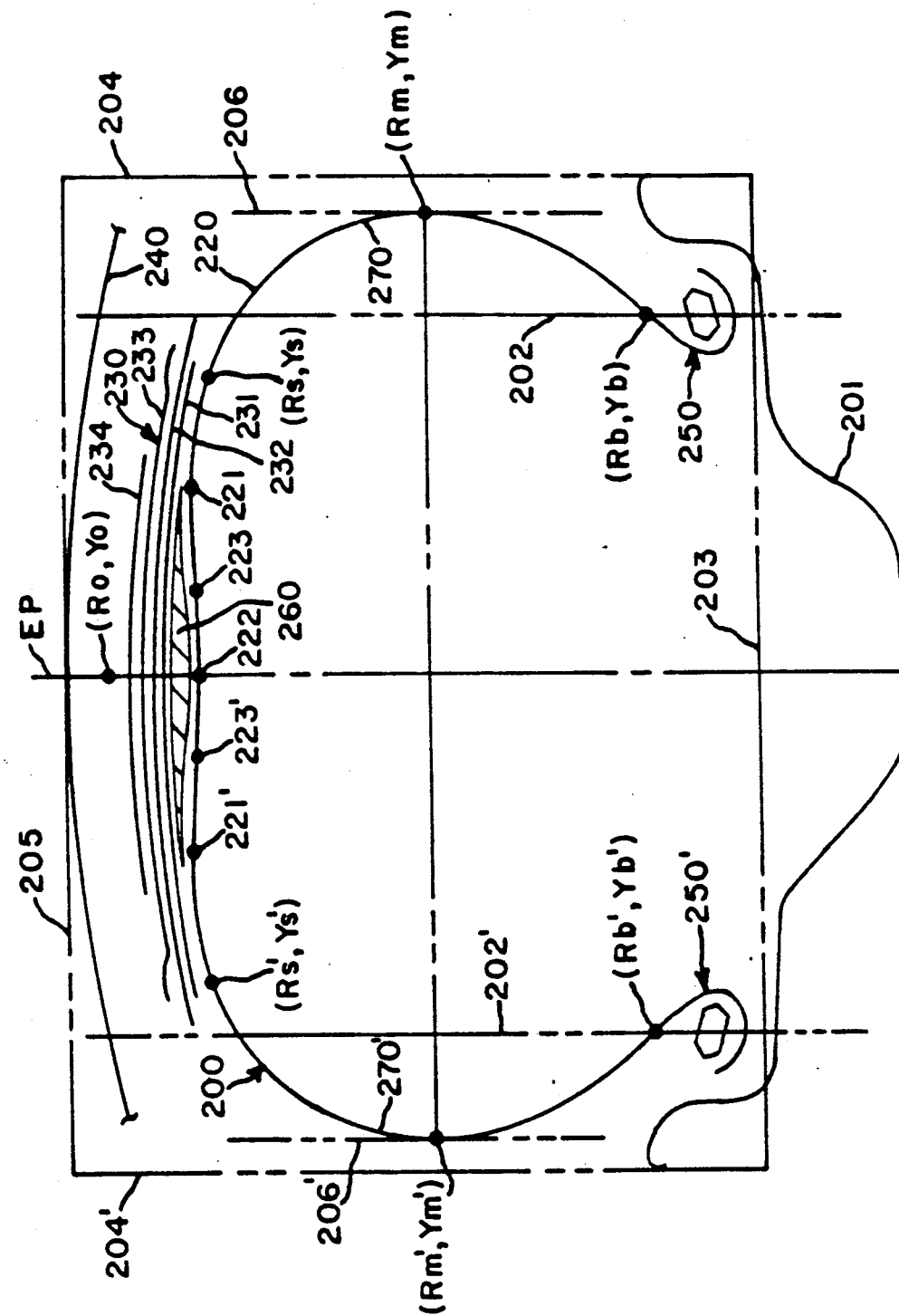

FIG. 16 schematically illustrates the carcass/belt structure contours for the belted radial-ply tire according to the aspect of the invention illustrated in FIG. 4.

Figure 12:
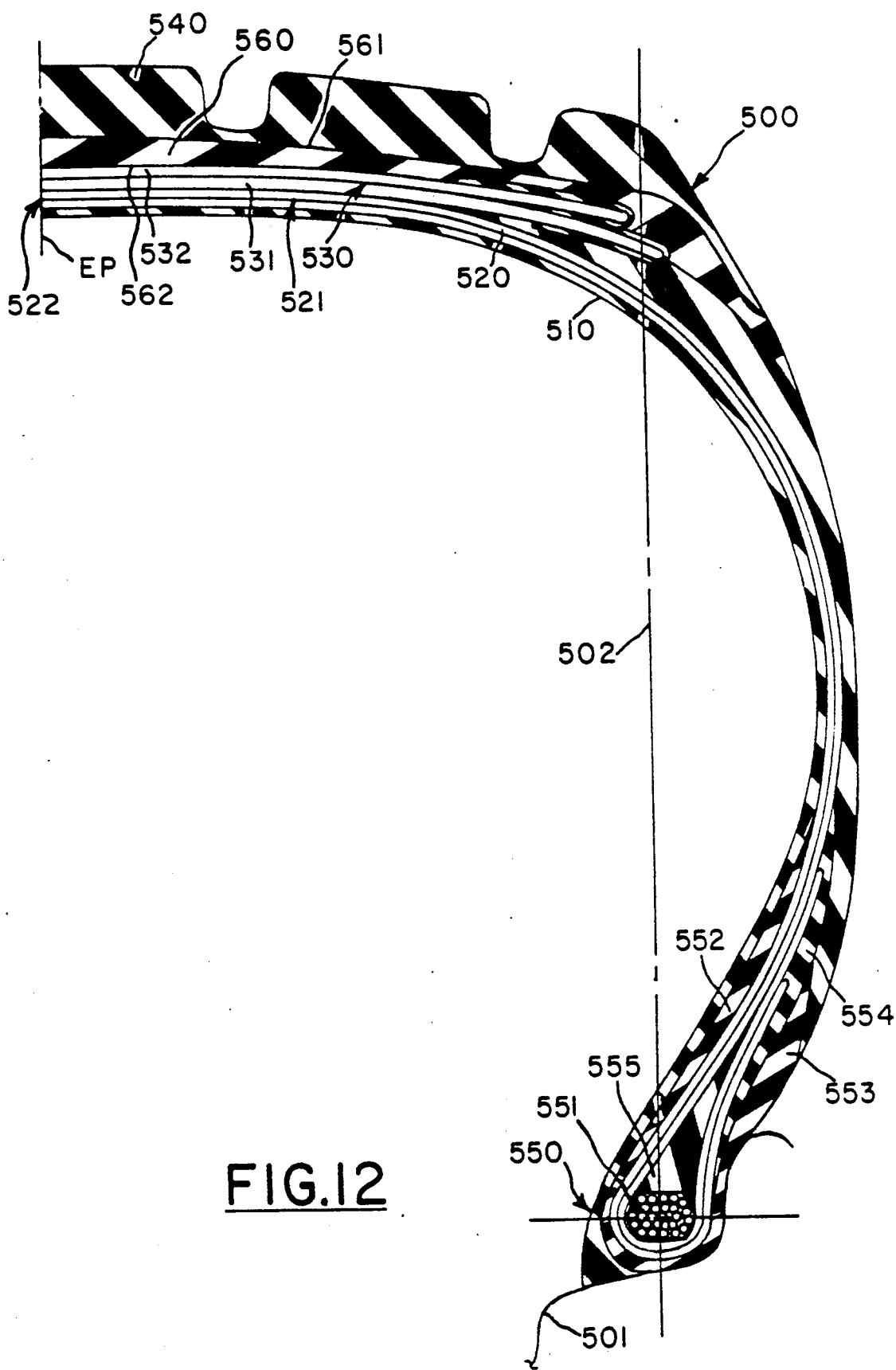
FIG. 12 is a full-scale, half-section profile view of a light-truck tire of size 245/75R16 of 75% aspect ratio and construction representing another aspect of the invention.
Figure 17:
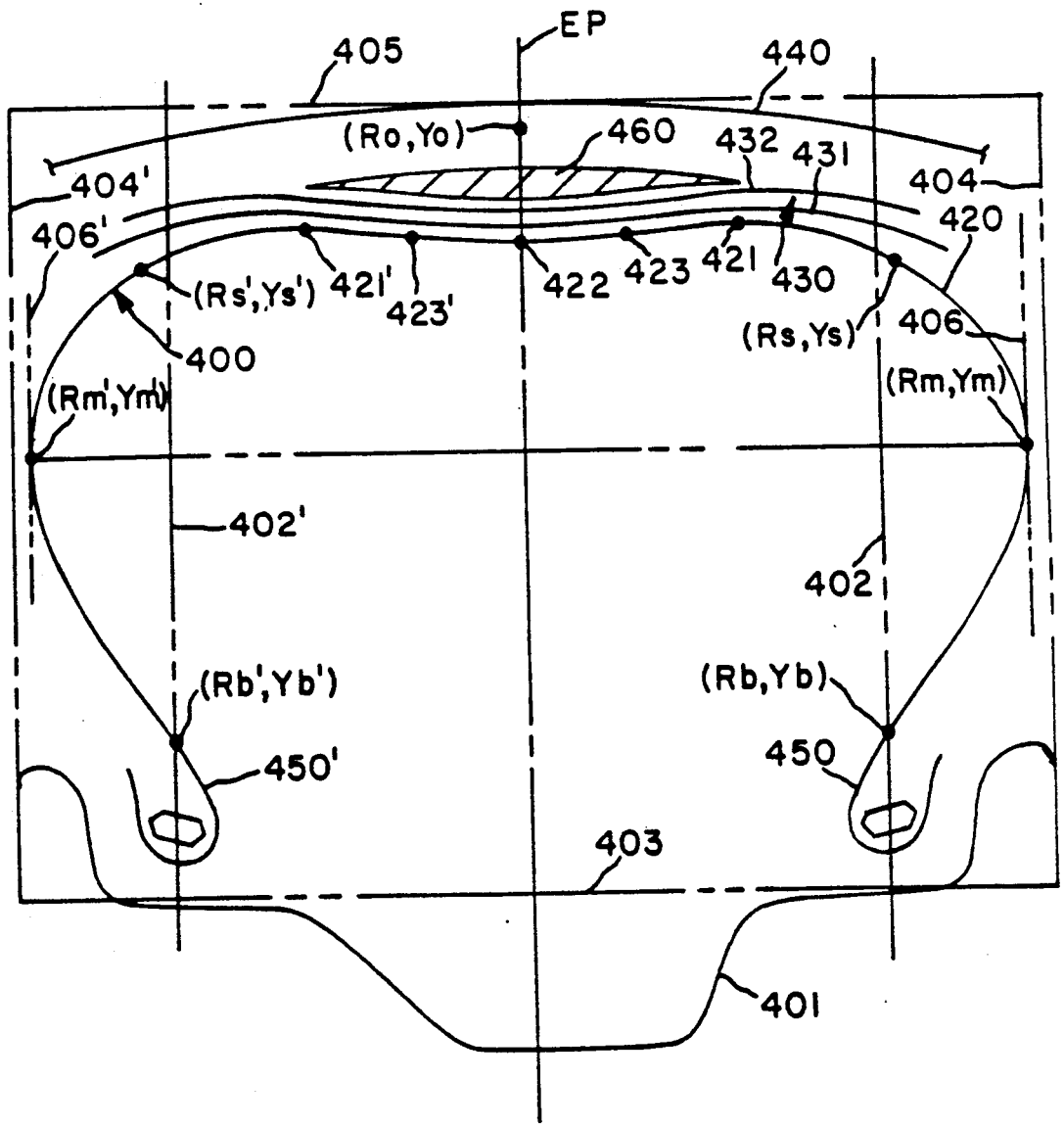

FIG. 17 schematically illustrates the carcass/belt structure contours for the radial-ply tire according to the aspect of the invention illustrated in FIG. 12.

The invention also may be better understood in the context of the following definitions, which are applicable both to the specification and to the appended claims:

"Pneumatic Tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load "Equatorial plane" (EP) means the plane perpendicular to the tire's axis of rotation and passing through the center of its tread.

"Cord" means the strands forming the plies in the tire.

"Cord angle" means the angle, left or right in a plan view of the tire, formed by a cord with respect to the equatorial plane.

"Ply" means a layer of rubber-coated parallel cords.

"Bead" means that part of the tire comprising an annular tensile member wrapped by ply cords and shaped, with or without other reinforcement elements such as flippers, chippers, apexes, toe guards and chafers, to fit the design rim.

"Radial-ply tire" means a belted or circumferentially-restricted pneumatic tire in which the ply cords which extend from bead to bead are laid at cord angles between 65° and 90° with respect to the equatorial plane of the tire.

"Rim" means a support for a tire or a tire and tube assembly upon which the tire beads are seated.

"Carcass" means the tire structure apart from the belt structure, tread, undertread, and sidewall rubber over the plies, but including the beads.

"Belt structure" means at least two layers or plies of parallel cords, woven or unwoven, underlying the tread, unanchored to the bead, and having both left and right cord angles in the range from 17° to 27° with respect to the equatorial plane of the tire.

"Sidewall" means that portion of a tire between the tread and the bead.

"Tread" means that portion of a tire that comes into contact with the road when the tire is normally inflated and under normal load.

"Tread width" means the arc length of the tread surface in the axial direction, that is, in a plane passing through the axis of rotation of the tire.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Section height" means the radial distance from the nominal rim diameter to the outer diameter of the tire at its equatorial plane.

"Aspect ratio" of the tire means the ratio of its section height to its section width, multiplied by 100% for expression as a percentage.

"Inflection point" means a point in a curved path at which its direction of curvature changes, that is, the center of curvature shifts from one side of the path to the other. An example of an inflection point is the center of the letter "S".

"Innerliner" means the layer or layers of elastomer or other material that form the inside surface of a tubeless tire and that contain the inflating fluid within the tire.

"Footprint" means the contact patch or area of contact of the tire tread with a flat surface at zero speed and under normal load and pressure or under specified load, pressure and speed conditions.

The modern radial-ply pneumatic tire is designed under standards promulgated by any of several organizations, including The Tire and Rim Association, Inc., The European Tyre & Rim Technical Organisation and the Japan Automobile Tire Manufacturers Association. Under the standards of these and other organizations, which are quite similar, when a tire of a given size is being designed, it is designed to be mounted on a "design rim", which is a rim having a specified configuration and width. The "design rim width" is the specific commercially available rim width assigned to each tire size and typically is between 70% and 75% of the specific tire's section width. The "tire design load" is the base or reference load assigned to a tire at a specific inflation pressure and service condition: other load-pressure relationships applicable to the tire are based upon that base or reference load. The terms "normal inflation pressure" and "normal load" as used herein refer respectively to the specific design inflation pressure and load assigned by the appropriate standards organization for the service condition for the tire.

The invention provides a radial-ply pneumatic tire that experiences uniform growth in its radial dimensions upon inflation from atmospheric pressure to its normal pressure. The invention in its preferred aspect will reduce stress levels at the tire's beads and belt edges, thereby, to improve substantially the tire's performance and life. In general, this is accomplished by imparting to the profile of the radial carcass ply or plies a reverse curvature and inflection points equally spaced from the equatorial plane of the tire. The reverse curvature (outwardly concave) shape of the carcass occurs in the region between two points. These points are respectively located on opposite sides of and equally spaced from the tire's equatorial plane and are points at which the radial carcass plies have their respective maximum radial dimensions.

This contour between the points of maximum radial dimension is not arbitrary but is designed to approximate the "natural" shape a carcass ply would take in an unbelted tire if the carcass ply, instead of being radial, were to have a cord angle less than a certain critical angle equal to about 25°. This critical angle is known in the prior art for bias-ply tires and is the ply cord angle at which bias carcass plies would begin to have a natural reverse or outwardly concave curvature in the undertread region of the tire carcass under normal inflation pressure. For further detail concerning the phenomena mentioned above, reference is made to John F. Purdy, *Mathematics Underlying the Design of Pneumatic Tires,* Hiney Printing Company, Akron, Ohio, 1963 (Second Edition), particularly Chapters I and II, as well as to the further discussion provided toward the end of this detailed description.

The invention, when practiced in its preferred form, provides a belted "radial-ply" tire which has "natural shape" in its sidewall regions for whatever "radial" cord angle is selected for the carcass ply or plies. However, the tire also has natural shape in the portion of the radial carcass underlying its belt structure, but this natural shape is for a cord angle substantially equivalent to that or those low angles (in the range from 17° to 27°) used in the belt structure. Preferably the maximum value of the low cord angles is the critical angle of 25° rather than 27°.

As will become apparent from further reading, the reverse curvature occurring between the spaced points of maximum radial dimension in the carcass of the radial-ply pneumatic tire is obtained with a wedge of elastomeric material formed between the tire's belt structure and carcass plies. Alternatively, in a preferred tire structure having two plies of cords at angles in the range from 65° to 80°, the wedge can also be placed above the tire's belt structure to impart reverse curvature to both it and the carcass.

Figure 1:
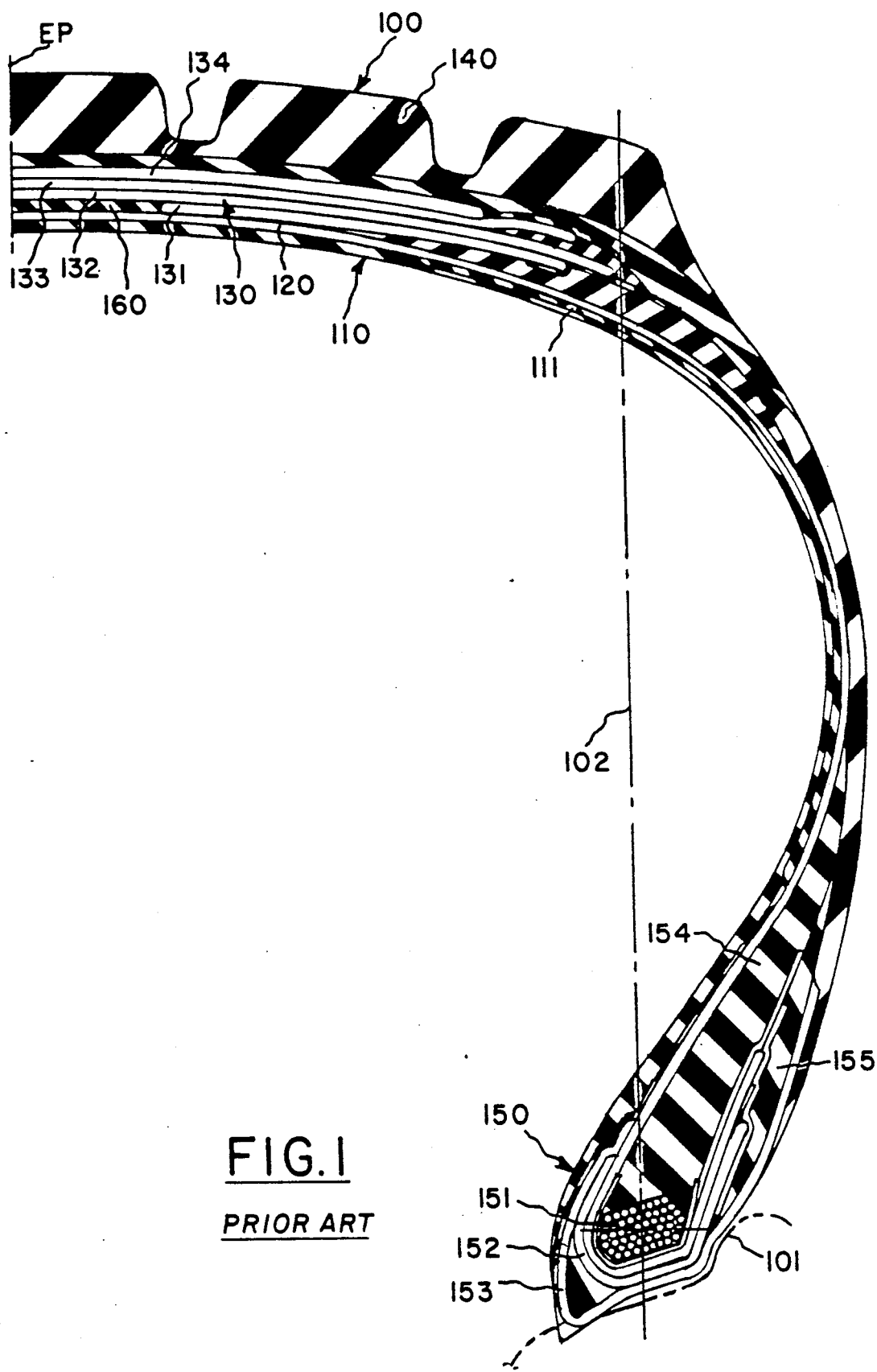
FIG. 1 is a reduced-scale, half-section profile of a prior art radial-ply pneumatic tire of size 16.5R22.5, a tire known as a "super-single" for use on trucks and having a 65% aspect ratio.

With particular reference now to the drawings, wherein like numerals refer to like components or elements in the several views, there is shown a prior art radial-ply pneumatic tire in FIG. 1. This tire, "super single" truck tire size 16.5R22.5 has a 65% aspect ratio, an equatorial plane EP, and is generally designated by the numeral 100. The tire has a halobutyl innerliner 110 on the radially interior side of a steel carcass ply 120. A belt structure, generally designated by the numeral 130, has cut plies 131, 132, 133 and 134 that circumferentially surround and restrict the normally-inflated shape of the 90° radial carcass ply 120. The radially innermost belt ply 131 is split and thus has two parts on opposite sides of and equally spaced from the equatorial plane an elastomeric material 160 fills the space between the two parts of the split belt. A tread 140 is located radially outwardly of the belt structure 130.

The tire 100 has a bead 150 that includes an annular tensile member 151 above which the carcass ply 120 is wrapped. The bead has a chipper 152 and a toe guard/chafer 153 forming part of its bead. Also, an apex 154 extends from the bead into the tire's sidewall region. A secondary stiffening element 155 also is provided. The outline of a portion of a rim flange is indicated at 101 in dot-dash line, as is a plane 102 that passes through the center of the annular tensile member 151 and that is parallel to the equatorial plane EP. The edges of the respective belt plies 131 to 134 are located axially inwardly with respect to the plane 102.

When the prior art tire shown in FIG. 1 is mounted on its rim 101 and inflated, it will undergo displacement (growth and/or contraction) in some of its dimensions as a result of the tensile stress imposed on the tire structure due to the inflation pressure. If normal inflation pressure is maintained for a period of time growth will continue, but it typically discontinues after about 24 hours. Changes in tire dimensions and footprint characteristics also can be noted after the tire is broken-in. For purposes of this description, break-in of a pneumatic tire means operating the tire under normal load and normal pressure for a period of 12 hours at a speed of 40 miles per hour.

Dimensional changes in the tire in response to inflation from atmospheric pressure to normal pressure usually are measured both for the new tire and for the tire after break-in. Footprints also are obtained. If the tire when mounted on the rim cannot maintain its beads properly seated or its general shape after being mounted and having its beads seated, then it is necessary to make the growth measurements by inflating the tire from a low pressure (rather than atmospheric pressure) to normal pressure. The low pressure will typically be less than 5% of normal inflation pressure. The term "atmospheric pressure" as used herein includes such minimum pressure as may be required to maintain the beads of a mounted tire properly seated on its design rim with its profile approximating the normally-inflated shape of the unloaded tire.

Figure 2:
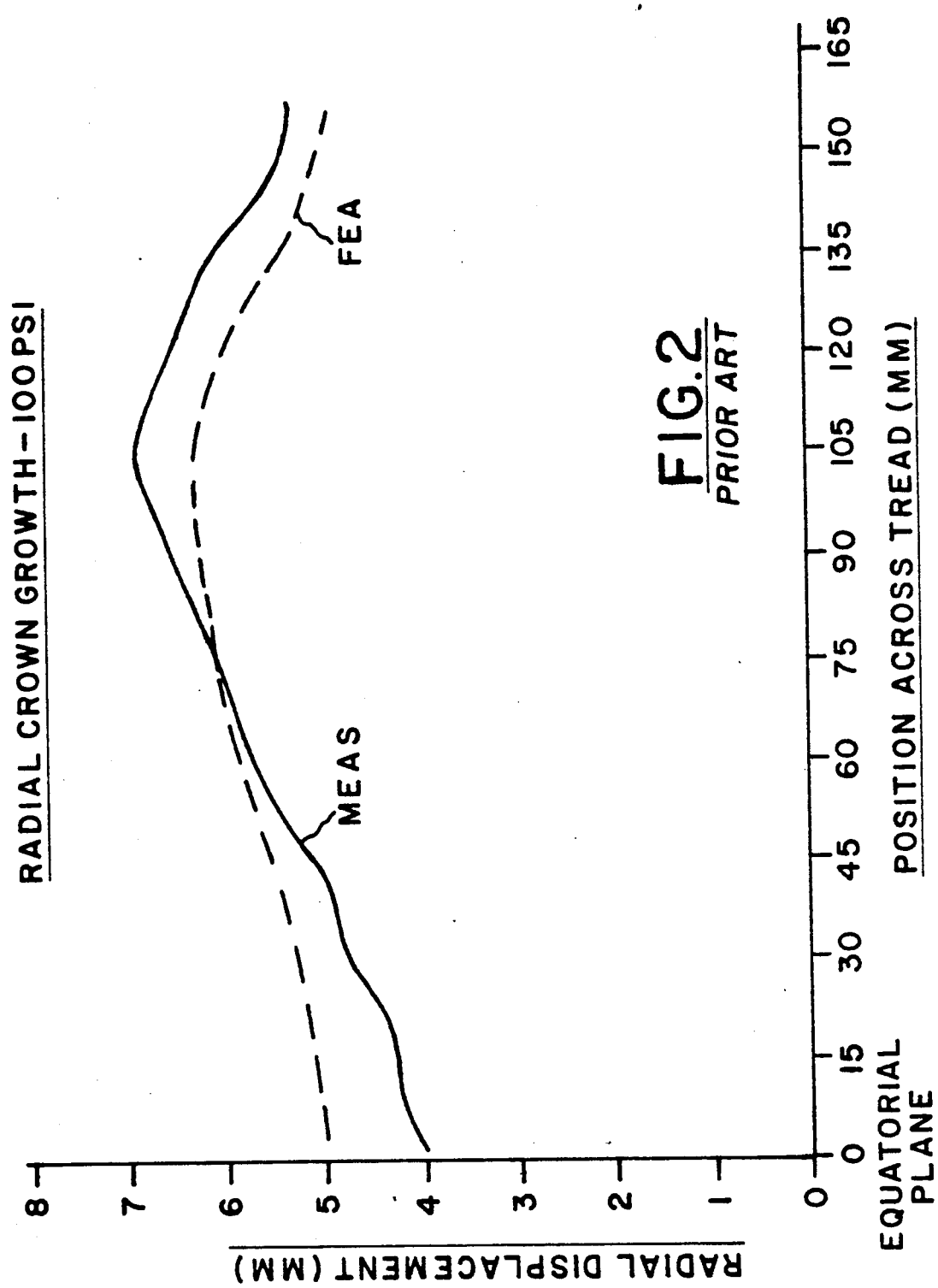
FIG. 2 is a graph illustrating the radial displacement or growth of the FIG. 1 tire, when inflated from atmospheric to normal pressure, as a function of position across the tread surface.
Figure 3:
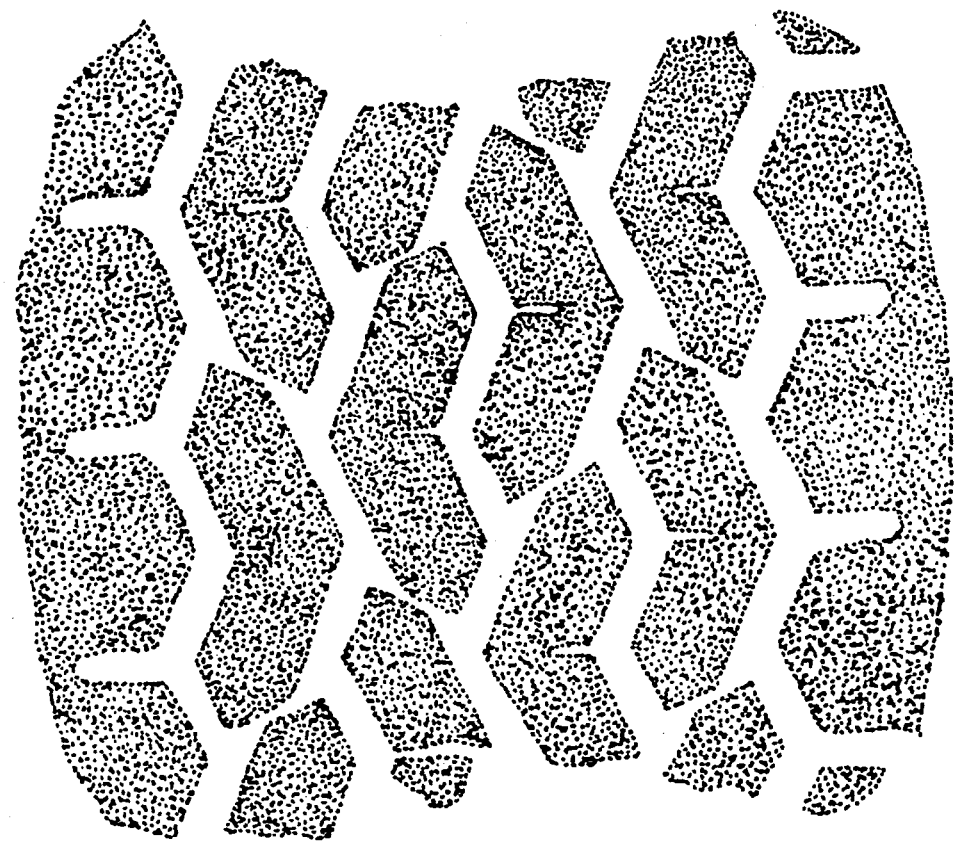
FIG. 3 is a footprint of the prior art tire illustrated in FIGS. 1 and 2.

FIG. 2 illustrates the radial displacement (crown growth) of the tread surface of the prior art tire of FIG. 1 as the tire is inflated from atmospheric to normal pressure of 100 lbs. per square inch (690 kilopascals). The radial crown growth of the tire is shown both as actually measured (indicated by the solid line identified MEAS) and as predicted by finite element analysis (dotted curve identified FEA). At the equatorial plane, the radial measured displacement of the tire was approximately 4 mm in response to inflation of the tire from atmospheric to normal pressure. The radial displacement of the tread surface increased as a function of position across the tread to a point about 105 mm from the equatorial plane at which the radial displacement peaked and thereafter declined to the lateral edge of the tread located about 155 mm from the equatorial plane. The maximum measured radial displacement of the tread surface at about 105 mm from the equatorial plane is almost 7 mm or approximately 75% greater than the 4 mm growth that occurred at the tire's equatorial plane. The results predicted by the finite-element-analysis curve FEA are similar, although the predicted equatorial-plane growth is about 5 mm with a peak of about 6.2 mm displacement occurring at the tread shoulder. While finite element analysis predicts lesser growth of the radial measurements to the tread surface than were actually measured as a result of tire inflation, nevertheless it remains nonuniform across the tread surface and the variation is above the 25% believed to be the maximum differential practicably allowable laterally across the tread if nonuniform tire wear and undesirable tire footprints are to be avoided. The footprint pattern produced by such a tire is illustrated in FIG. 3 and exemplifies an undesirable "butterfly" shape that is characteristic of tires providing nonuniform load distributions in the tire's footprint.

FIG. 4 illustrates a tire 200 constructed in accordance with one aspect of the invention. This "super single" size 16.5R22.5 radial-ply tire has an innerliner 210 having a radially outer layer 211 that is precured prior to molding of the tire. A steel-cord 90° carcass ply 220 extends between the respective beads 250 of the tire, which include an annular tensile member 251 and a chipper 252. Elastomeric components 254 and 255 provide stiffening of the lower sidewall area and protection of the beads where they mount on the rim shown in dot-dash line at 201. A plane 202, parallel to the equatorial plane EP of the tire, passes through the center of the annular tensile member 251 in the bead. The belt structure, generally designated by the numeral 230, has the lateral edges of its four plies positioned at or axially inwardly of the plane 202. The belt structure includes a first ply 231, a second ply 232, a third ply 233 and a fourth ply 234 having cord-angle ranges respectively of 55° to 65° right, 18° to 21° right, 18° to 21° left, and 18° to 21° right. The plies in the belt structure have steel cords in the preferred super-single tire, but other known materials may be used. The belt ply 234 is provided primarily for protection of the underlying belt and carcass plies from intrusion of foreign objects through the tread 240. Apex materials 254 and 255 provide a stiffness gradient in the lower sidewall region of the tire.

To provide uniform growth of the tire upon inflation from atmospheric to normal pressure, the tire has a reverse curvature in its carcass ply 220. The outwardly concave reverse curvature is centered about the equatorial plane due to the presence of a wedge 260 comprising an elastomeric material that preferably has low hysteresis characteristics. This wedge means for causing the reverse curvature is positioned between the radial carcass ply 220 and the belt structure 230 and has the shape shown in FIG. 5. The radially outer surface 261 of the wedge 260 may be seen to be convex in the radially outward direction of the tire, as is more clearly shown in the exaggerated dot-dash line 262 of FIG. 5. The radially inner surface 263 of the wedge has a more complex shape generally resembling a low-amplitude cosine wave, as is indicated by the exaggerated shape line 264 of FIG. 5. (The shape of the wedge preferably is determined using the procedure for defining the carcass ply line described in connection with FIGS. 16 and 17.) The height at the equatorial plane of the wedge 260 preferably is less than or equal to 5% of the width W thereof and preferably is only about 2% thereof in the illustrated tire 200.

With reference again to FIG. 4, it may be seen that the belt structure 230 is convex in the radially outward direction. On the other hand, the radial carcass ply 220 has a reverse curvature in the undertread region extending between points 221 positioned on the respectively opposite sides of the equatorial plane EP and equally spaced from it. The points 221 are located at respectively maximum radial dimensions of the carcass ply 220 from the axis of rotation of the tire (not shown). At the point 222 on the equatorial plane of the tire, the radial carcass ply 220 has a radial dimension that is reduced from the maximum radial dimensions at the points 221 on opposite sides of the equatorial plane. Due to the reverse curvature of the carcass ply, inflection points 223 are located at equally spaced distances from the equatorial plane on opposite sides of the tire and between the point 222 and the respective points 221 at which the respective maximum radial dimensions of the carcass ply occur. It should be noted that the points 221 of maximum carcass radial dimensions are located axially inwardly of both the center of the annular tensile members 251 and the edges of the "working" belt plies 232 and 233 and the underlying belt ply 231. It is axially inward of the belt-structure edges that inflation-pressure and load stresses of the tire are imposed primarily on the belt structure as opposed to the carcass underlying the belt structure. This stress concentration in the low-angle cords of the belt plies restricts the radial carcass ply from assuming its natural shape when pressurized and makes the reverse curvature of the carcass ply desirable for reasons that may be more fully understood from the discussion below subtitled "Tire Design Theory".

Figure 5:
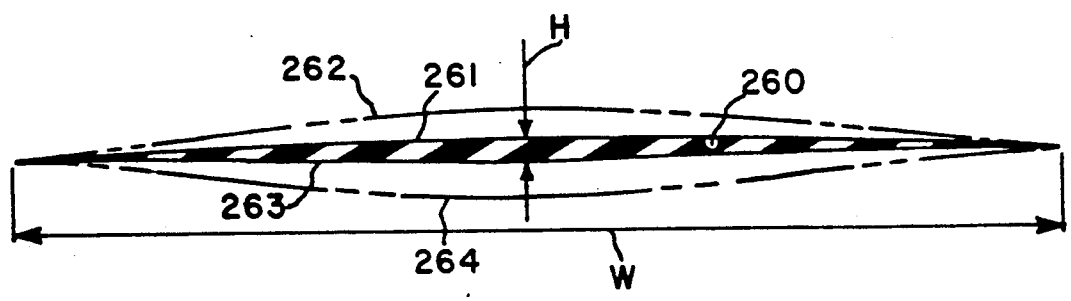
FIG. 5 is a sectional view of a wedge which is a component of the tire shown in FIG. 4.
Figure 6:
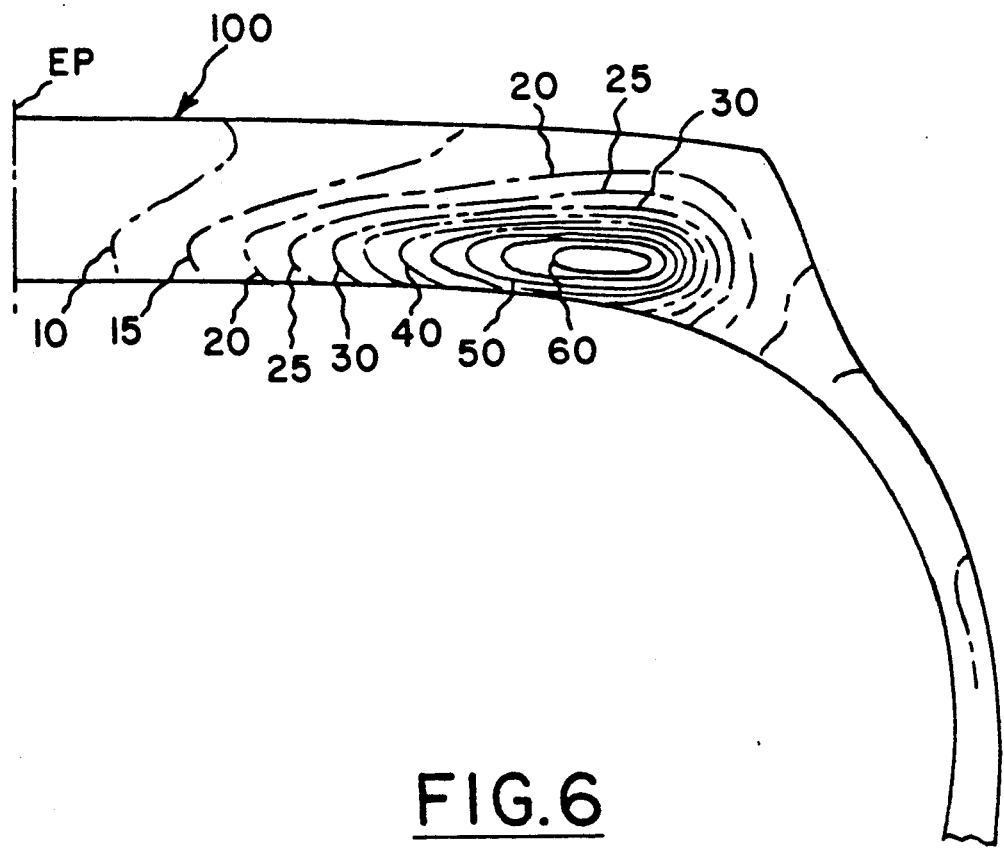
FIG. 6 is a schematic view illustrating stress levels in the prior art tire of FIG. 1.
Figure 7:
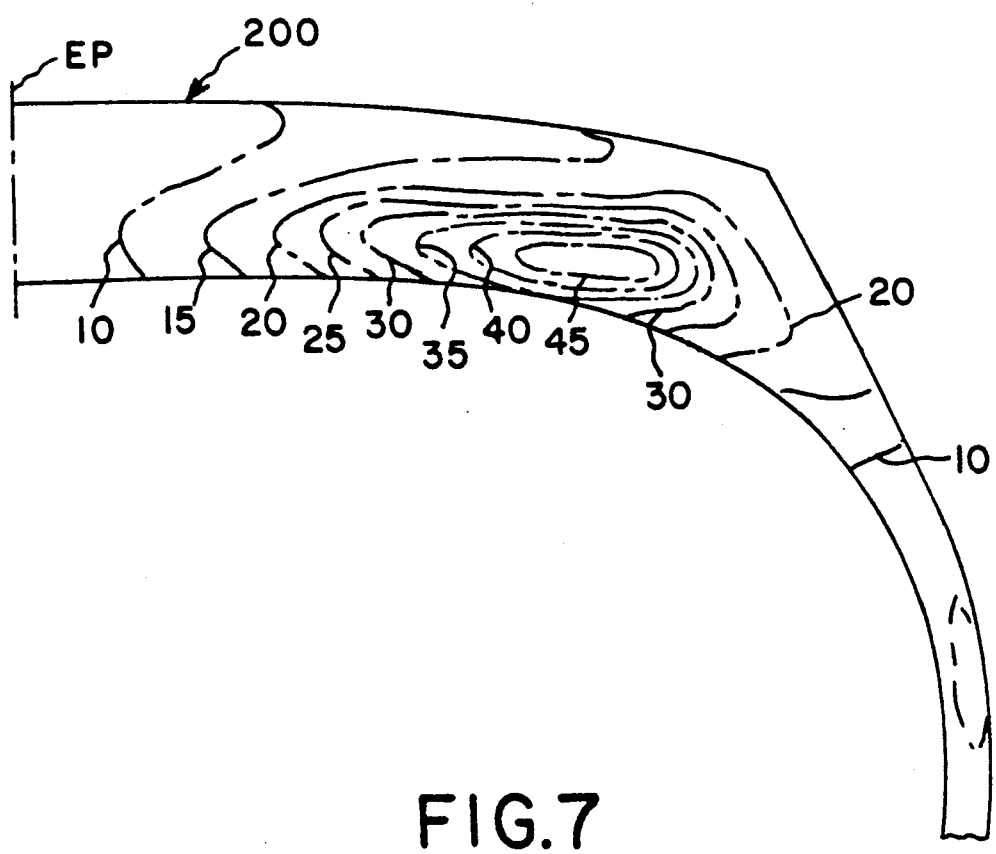
FIG. 7 is a schematic view of stresses in the tire illustrated in FIG. 4.

In FIG. 5, the dimension W is the distance between the points 221 located on opposite sides of the equatorial plane. The dimension H is measured immediately above the point 222 at the equatorial plane. The inflection points in the radially inner curvature 263 of wedge 260 may be seen in the exaggerated curve 264. FIGS. 6 and 7 illustrate the stress levels, determined by finite element analysis, in the prior art tire 100 of FIG. 1 and in the tire 200 of FIG. 4 constructed in accordance with one aspect of the invention. In both FIGS. 6 and 7, lines of equal stress are shown by dot-dash lines given numerical values representing relative stress magnitudes. In general, the stresses in the shoulder and belt-edge areas of the prior-art tire (FIG. 6) are much greater in both magnitude and gradient than in the tire of the invention (FIG. 7).

FIG. 8 illustrates the footprint of a tire constructed in accordance with FIG. 4 and may be contrasted with the footprint of FIG. 3 representing the prior art tire of FIG. 1, which is a tire used as a "control" due to its similarity in construction, compounds, design and size to the tire of FIG. 4. The FIG. 8 footprint is well-rounded as compared to the "butterfly" shape of the FIG. 3 footprint. The FIG. 8 footprint is for a new tire, but after break-in of the tire, the desirable footprint shape is retained as illustrated in FIG. 9.

Figure 10:
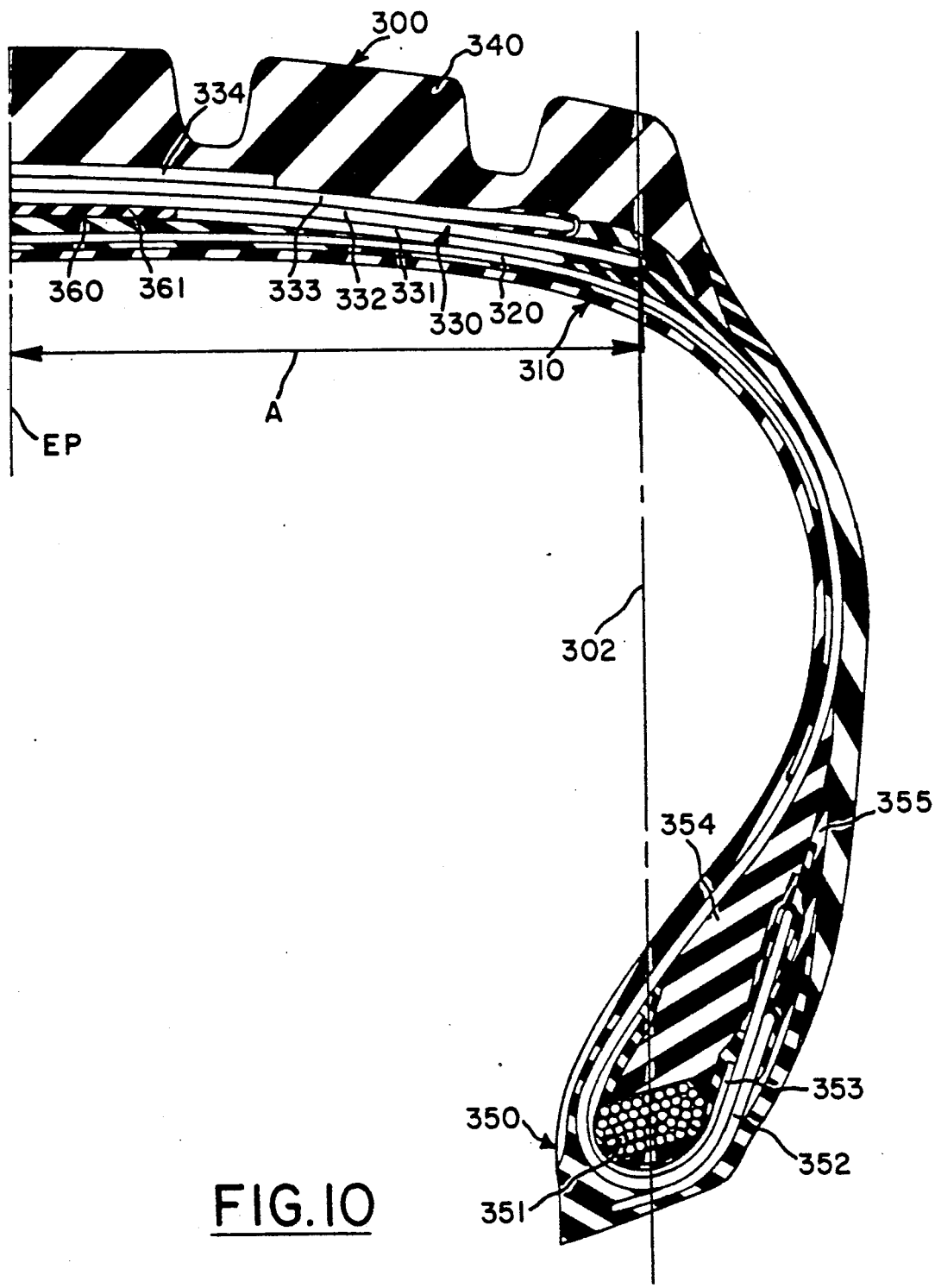
FIG. 10 is a reduced-scale, half-section of the profile of a tire representing a second aspect of the invention. It is a truck tire of metric size 245/70R19.5, a tire size of particular application on European trucks and having a 70% aspect ratio.

In FIG. 10, there is shown a half-section profile view of a medium truck tire 300 of size 245/70R19.5 and having a 70% aspect ratio. The tire has an innerliner 310, a radial steel-cord carcass ply 320, and a belt structure 330 including a split first-ply 331, second and third "working" belt plies 332 and 333, and a fourth belt ply 334 narrower than the working belt ply and designed primarily for protection of the layers beneath it.

The tire 300 has a tread 340 of width in the range from 65% to 80% of its section width and preferably is about 75% thereof. A plane 302 passes through the center of the annular tensile member 351 in the bead 350. A chipper 352 is provided, as is a flipper 353 surrounding the member 351. An elastomeric apex 354 extends upwardly to vary the lower sidewall stiffness in conjunction with elastomeric member 355. The cut edges of the working belt plies 332 and 333 are at or on the axially inner side of the plane 302 and differ slightly in width as illustrated.

In the preferred form of the tire 300, the first split-ply 331 has a cord angle of 20° left in contrast to the 55° right cord angle of a similarly positioned ply in the "control" tire of the same size used to evaluate tire 300. The working belt plies 332 and 333 have cord angles in the range from 17° to 27° (18° to 21° is preferred). The cord angles in the working plies 332 and 333, located between the radially innermost split-ply 331 and the radially outermost protective belt ply 334, are at right and left angles, respectively, with respect to the equatorial plane EP. The cord angles of the protective ply 334 preferably are oriented to the right.

The tire 300 has a wedge 360 of elastomeric material that may be formed as a part of the elastomer 361 needed to fill the space between the two halves of the split-belt ply 331. The wedge 360, in association with the belt structure 330, which is generally concentric with the tread radius, provides a reverse curvature to the carcass ply 320. The carcass ply has a radial dimension at the equatorial plane that is reduced from the maximum radial dimensions thereof which may be seen to occur at equally spaced points on opposite sides of the equatorial plane. The carcass ply has inflection points located at equally spaced distances from the equatorial plane and between the respective maximum radial dimensions of the carcass ply 320, which dimensions occur at the lateral edges of the wedge that causes the reverse curvature of the carcass ply. These points of maximum radial dimension in the profile of the tire are axially inward of the lateral edges of the belt structure and of the plane 302. The reverse curvature and associated maximum radial dimensions and inflection points result from the presence of the wedge 360, the dimensional height of which at the equatorial plane should not be regarded for purposes of the invention as including the thickness of the elastomeric portion 361 corresponding to that of the split-belt ply 331.

Figure 11E:
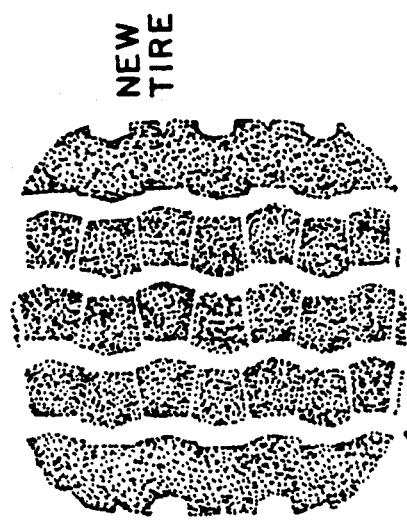
FIGS. 11A through 11F illustrate footprints for three tires, both before and after break-in. One of the tires is of a prior art design used as a control and the other two are of designs according to the invention.
Figure 11F:
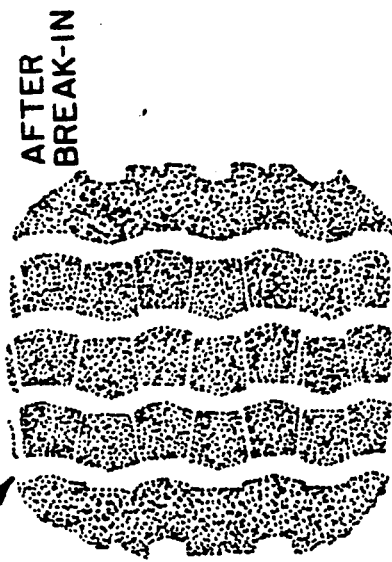
Figure 11C:
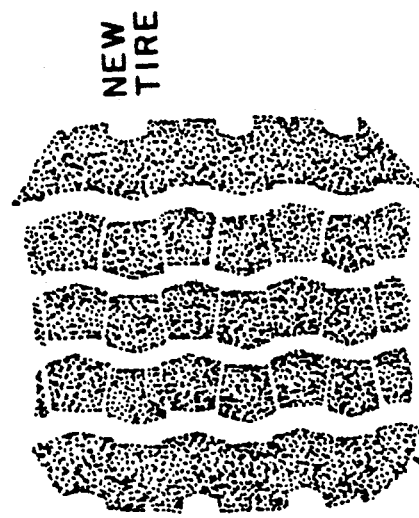
Figure 11D:
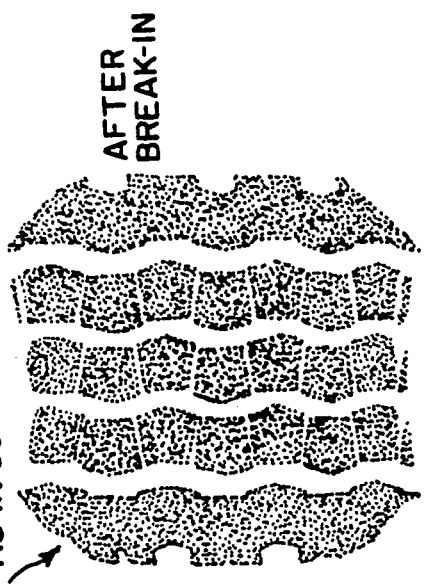
Figure 11A:
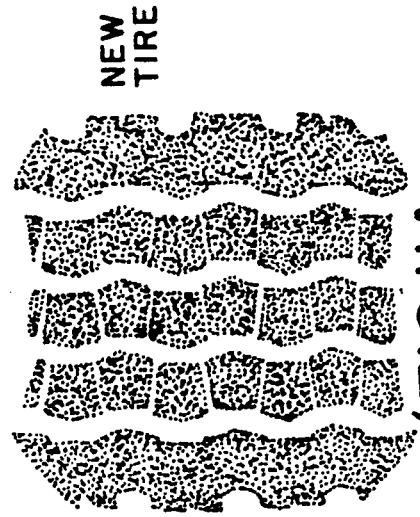
Figure 11B:
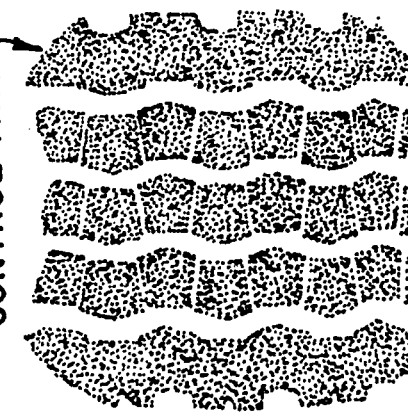

FIGS. 11A and 11B illustrate footprints for a prior art control tire (a Goodyear G291 ® tire) manufactured by a subsidiary of the assignee and most nearly similar to the tire of FIG. 10. FIG. 11A shows the footprint for a new tire and FIG. 11B shows the footprint for the same tire after it had been broken-in in the manner previously described. It may be seen that both of these footprints for the size 245/70R19.5 radial-ply tire have "butterfly" shapes generally regarded as being undesirable for the reasons previously mentioned.

FIGS. 11C and 11D are respectively similar in displaying footprints for a tire, both as new and after break-in, but the tire had an elastomeric wedge. The wedge was similar to that illustrated at 360 in FIG. 10, but the dimension "A" was narrower than that illustrated in FIG. 10 and in fact was comparable to that in the prior-art control tire.

FIGS. 11E and 11F illustrate footprints for the tire as shown in FIG. 10. From FIGS. 11C through 11F it may be seen that the "butterfly" characteristics of the prior-art footprint are reduced through use of the wedge 360. The footprints illustrated in FIG. 11 were obtained on a tire mounted on a 6.75 inch rim and demonstrate a good correlation with predictions of a finite-element-analysis model.

In contrast to the control tire, the tire of FIG. 10 whose footprints are shown in FIGS. 11E and 11F had a belt structure 330 constructed in accordance with the teachings of commonly-assigned U.S. application Ser. No. 811,072 filed Dec. 19, 1985, now abandoned, filed by G. V. Adam et al. The finite-element predictions also indicate, as compared to the control tire, substantially improved uniformity of growth of the tire when inflated from atmospheric pressure to normal pressure of about 700 kilopascals.

With reference now to FIG. 12, there is shown a full-scale, half-section profile view of a light-truck tire 500 of size 245/75R16. This tire, as illustrated has the upper limit of the aspect ratios for which the reverse-curvature feature of the invention provides significant benefits. This tire also represents a further aspect of the invention in that both its carcass plies and its belt plies have a reverse curvature, that is, they have respective portions centered about the equatorial plane EP that are outwardly concave and this is combined with carcass plies having "radial" cord angles in the range from 65° to 80°.

The tire 500 has an innerliner 510 and a carcass 520 consisting of two plies having cord angles in the above-mentioned range from 65° to 80°, one of the carcass plies being angled right and the other left. Cord angles of about 70° are preferred and the preferred material for the textile carcass plies is polyester. A belt structure 530 in the tire is formed by two belt plies having cord angles, also right and left respectively, in the preferred range from 18° to 21° and, in any case, less than or equal to a "critical angle" of 25° described in greater detail hereinafter. Belt plies 531 and 532 are of different widths and the reverse curvature in the belt structure and carcass occurs over a region between two points centered about the equatorial plane EP of the tire; one of these points is indicated at 521 in FIG. 12. The region of reverse curvature thus may be seen to be on the axially inner side of the lateral edge of the belt structure and also on the axially inner side of the plane 502 that is parallel to the equatorial plane and that passes through the center of the annular tensile member 551 in the bead 550.

The material for the cord in the belt plies (other than the nearly zero-degree or very low-cord-angle overlays of nylon or other material conventionally used in passenger tires to achieve required speed ratings) may be steel or aromatic polyamide, but the latter material may be more desirable in certain applications. For example, passenger tires, having aspect ratios in the preferred range from 40% to 65% and constructed generally as described in the preceding paragraph, will have more lateral stiffness than conventional 90° radial tires due to the 65° to 80° cord angles in the carcass plies. This, in combination with the reduced belt-edge and bead stresses due to the reverse curvature, may make the more supple aromatic polyamide material the material of choice. The reverse curvature and its reduced-stress advantages make this material, with its higher strength-to-weight ratio and non-corrosive characteristics, attractive as compared to steel tire cord; despite the availability of aromatic polyamide as a belt reinforcement material, steel cord has largely continued in use at least partially due to belt-edge stress levels and gradients.

The tire in FIG. 12 has elastomeric stiffening and protective elements 552, 553, 554, and 555; with the reverse curvature carcass depicted in FIGS. 16 and 17, and particularly where aspect ratios are in the range from 40% to 65% and carcass cord angles are in the range from 65° to 80°, the number and size of such lower sidewall stiffeners may be reduced. Of course, the extent to which this is done depends upon the response desired from the tire, cost and simplicity of manufacture, handling characteristics, etc.

Maximum radial dimensions of the carcass 520 occur at points 521 equally spaced from, and on opposite sides of, the equatorial plane EP. The radial dimension to the carcass 520 at the equatorial plane, that is, at point 522, is reduced very slightly from the maximum radial dimensions at the points 521. Thus, 75% aspect-ratio tire 500 in FIG. 12 represents the limiting case as to aspect ratio for a tire having a reverse curvature according to the invention. As aspect ratio decreases below 75%, greater benefits are achievable through use of the inventive concepts.

A wedge 560 of undertread elastomeric material is positioned above the belt structure 530 to provide reverse curvature, centered about the equatorial plane, in both the carcass 520 and the belt structure 530. The wedge 560 has a convex upper surface 561 that is concentric with the radius of the surface of the tread 540. On the other hand, the radially inner surface 562 of the wedge preferably has a shape in its central region generally resembling a low-amplitude cosine function; this induces the reverse curvature in the carcass plies and belt structure, which has cord angles less than or equal to a "critical angle" of about 25° described in greater detail hereinafter. The exact shape for the carcass and belt structure in the region underlying the tread is intended substantially to approximate the natural shape for a ply having the low cord angles of the belt plies.

Figure 13:
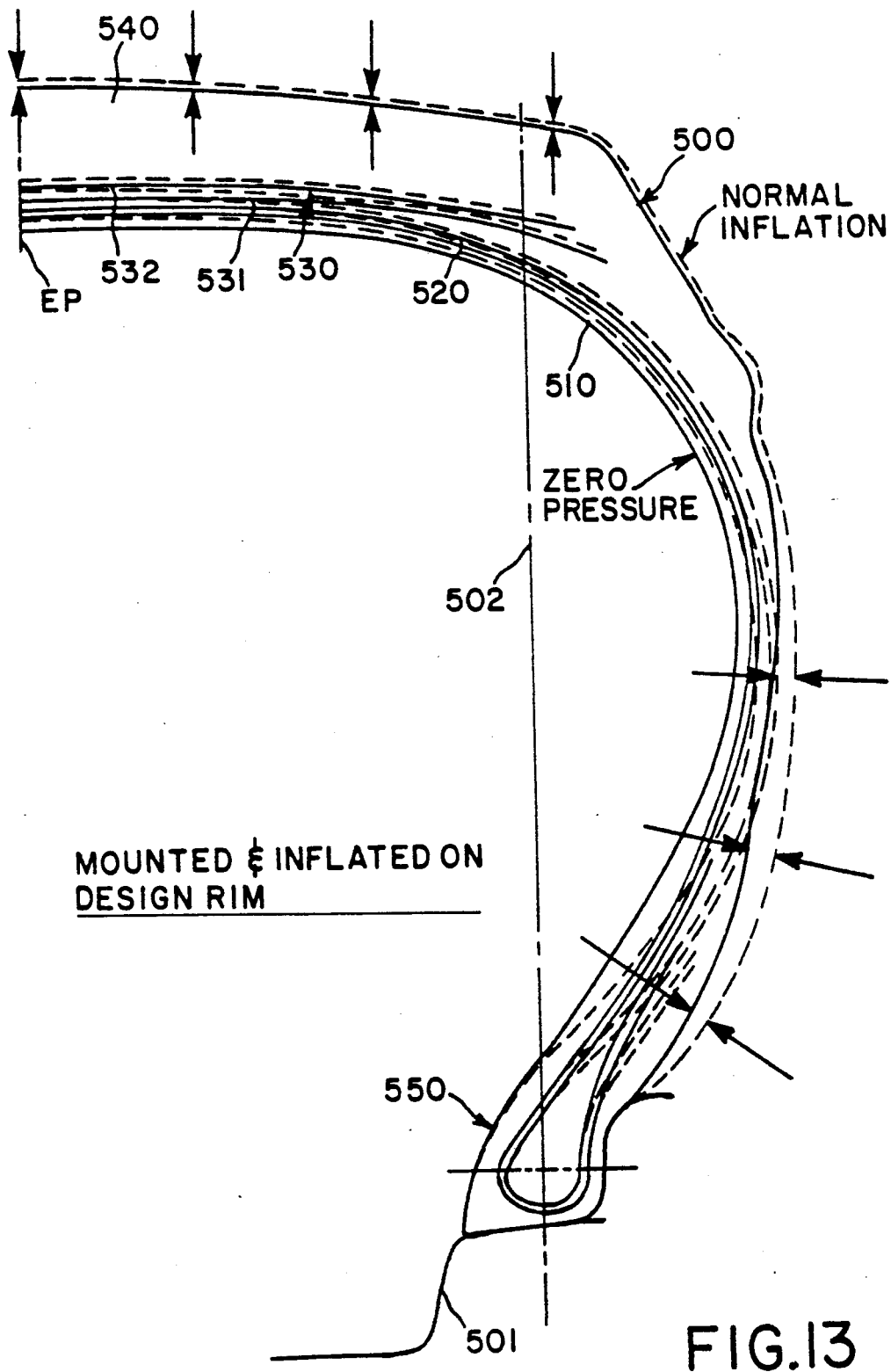
FIG. 13 is a full-scale, half-section schematic profile of the light-truck tire of FIG. 12 illustrating growth of its dimensions upon inflation from atmospheric pressure to normal pressure.

FIG. 13 is a schematic view of the tire of FIG. 12 and illustrates in dotted lines the desired dimensional growth of its exterior dimensions and components as a result of inflation from atmospheric pressure to a normal inflated pressure of 80 lbs. per square inch (about 560 kilopascals). As may be seen at the paired arrows at the top of FIG. 13, the tread surface grows quite uniformly from the equatorial plane to the tread shoulder. The growth near the tread shoulder is less than the growth at the equatorial plane of the tire. The remaining exterior dimensions of the tire also experience substantially uniform increases in dimension, as is indicated by the paired arrows above the flange of the rim 501 on which the tire is mounted.

TIRE DESIGN THEORY

Figure 14:
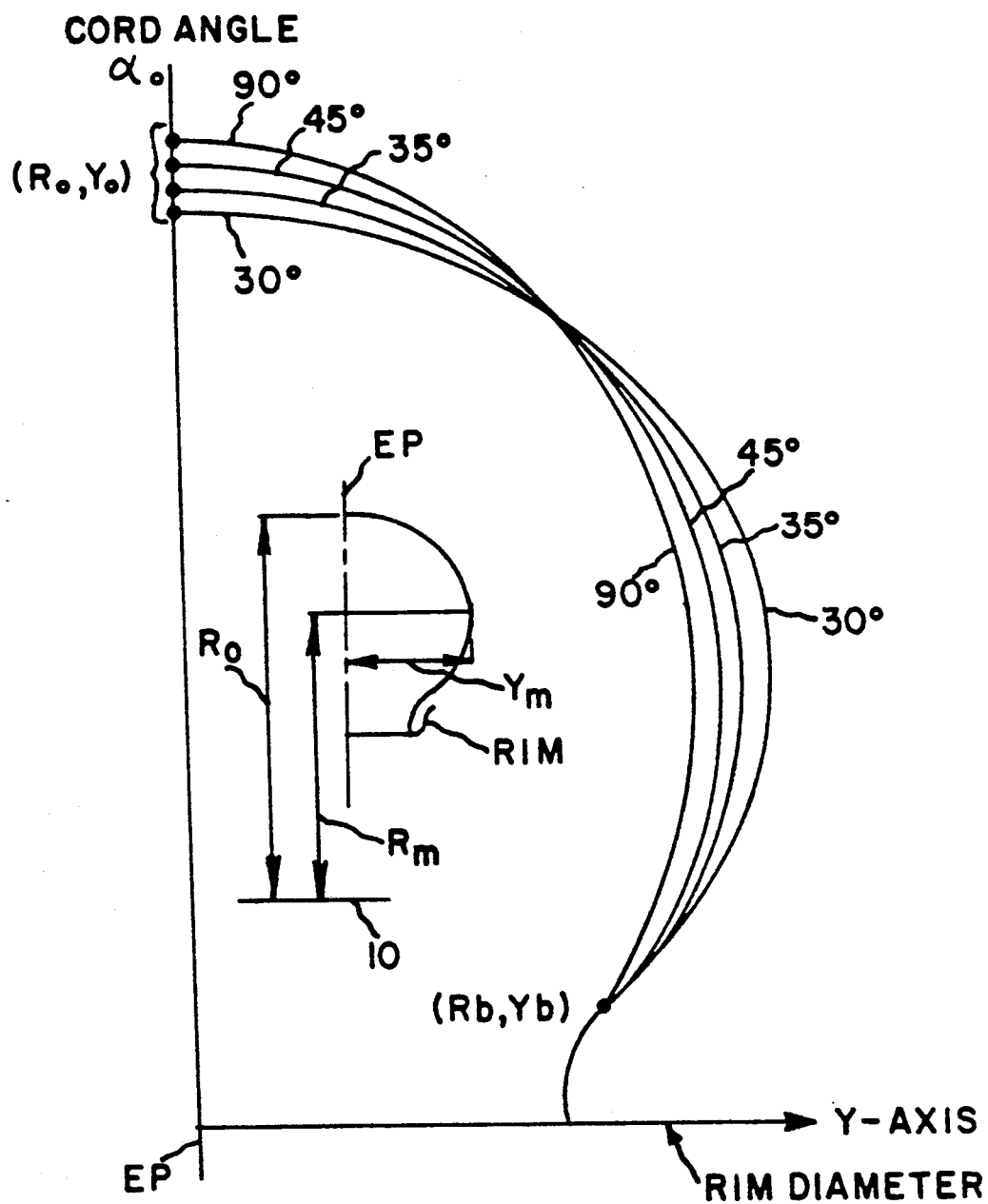
FIG. 14 is a family of curves illustrating tire carcass contours for carcass plies having various cord angles. The curves are for tires that are unrestricted by belt structures and are for the same nominal size (load carrying capacity).

With reference now to FIG. 14, there is shown a family of curves adapted from the Purdy publication previously mentioned. The curves are for tires having bias plies and represent the neutral contours of plies of various cord angles as the plies appear in profile view. The curves represent a carcass structure of a tire having thin components that do not stiffen the carcass in a manner that would prevent the ply from taking their "natural shape". Radial dimensions are referenced to the axis of the tire, as is indicated at 10 in the reduced-scale drawing in the center of FIG. 14. The dimension Ym is the distance from the equatorial plane of the carcass to its neutral ply line at the maximum section width. The contours shown are for tires of the same size, that is, tires that have the same load carrying capacity. It may be seen from FIG. 14 that the lower cord angles produce section ply contours of reduced aspect ratio leading to corresponding naturally-reduced aspect ratios for tires incorporating carcasses at these lower cord angles. The radial or 90° contour has a "natural shape" that is of aspect ratio greater than 1, but when used in a radial-ply tire, the circumferential belt structure used in the tire restricts the undertread portion of the carcass ply contour such that it is unable to assume this higher aspect ratio. Hence, the shape of the radial-ply tire carcass is circumferentially restricted in the region under its belt structure.

The points (Ro, Yo) at the upper part of the various contours represent the maximum radial dimensions the carcass contour of natural shape would take assuming that it is unrestricted by a belt structure. The points (Rb, Yb) above the center of the annular tensile members in the beads of the tire represent locations on opposite sides of the equatorial planes at which the ply contour can begin to take its natural shape unimpeded by the restrictive character of the annular tensile member and the rim flange.

In the Purdy publication, there is an equation 14 at page 13 which defines the contour of an unrestricted tire in terms of its dimensions and cord path. These dimensions, radial R and axial Y, and the cord angle $\alpha$ of the carcass plies, are included in the equation which is known as a hyperelliptc integral for which, at the time the book was published, there was no known mathematical method of general solution. Particular solutions were, however, obtainable and iterative numerical methods have been used to provide particular solutions.

FIG. 15 represents tire carcasses the cord angles of which are at 90°, 40°, 24° and less than 24° as shown. The shapes of the tire carcasses having cords of these angles as predicted by the solutions to the Purdy equation are shown as they appear about the equatorial planes EP of the various constructions. At 90°, the carcass natural shape per the prediction of the Purdy hyperelliptic equation is as shown at 20, but this equation also has a root represented by the infinitely distant, arcuately-shaped contour 22.

At a carcass cord angle of 40°, the naturally shaped tire has the contour 24 and the secondary root is represented by an arcuately-shaped contour 26 that flattens as it gradually approaches the contour 24.

There is a certain critical cord angle defined by equation 27 on page 42 of the Purdy publication as:

$$\alpha_0 = \arctan\sqrt{\frac{1 - Rm^2/Ro^2}{2}}$$

This critical angle was usually near 24° in the bias tires common at the time the Purdy publication was written; in tires having the lower aspect ratios involved in the present invention, the dimensions Rm and Ro are such that the critical angle is near 25°.

At cord angles less than 24°, the secondary root joins with the primary root to form a 24° bias-ply tire carcass contour 34, which was predicted by the Purdy equation, and experimentally verified per the Purdy publication, to have a reverse curvature 36 as shown. However, this reverse curvature has never been regarded as being of significance in the bias-ply tire art because suitable cord angles for practical tires of this type are on the order of 37°. More importantly, prior to this invention, the reverse curvature as a natural shape has not been regarded as being applicable to radial-ply tires because the carcass plies have even higher cord angles than those of bias-ply tires.

From the preceding descriptions of the tires illustrated in FIGS. 4, 10 and 12, it may become evident that the tire constructed according to one aspect of the invention incorporates a carcass contour in its sidewall regions that is of natural shape for the "radial" carcass, whereas the area of such carcass beneath the tread and belt structure approximates the reverse-curvature Purdy-equation natural shape for the cord angle or angles of the belt structure in the range from 17° to 25° or 27° (25° is preferred). Where both carcass and belt structure have reverse curvatures, such as in the tires illustrated in FIGS. 12 and 17, the cord angles of the working plies of the belt structure are less than 25° and are allowed to take the natural shape for cords at such angles. In the tires illustrated in FIGS. 4 and 10, the belt structure has plies that retain their outwardly convex shape, but the radial carcass portion beneath the belt structure is allowed to take a reverse curvature which, rather than being characteristic of a radial ply, is instead characteristic of a ply having the cord angle or angles of the plies in the belt structure. This has quite unexpectedly been found to provide the uniform dimensional growth and reduced-stress benefits previously described.

When the outwardly convex belt structures are used in conjunction with a reverse-curvature carcass ply, as illustrated in the tire structures of FIGS. 4 and 10, it is as yet unclear as to whether or not the cord angles in the belt plies must be less than the critical angle of about 25°. In other words, the cord angle may be up to about the 27° used in radial tires while still providing at least some of the benefits described herein. The reason for this uncertainty will become more apparent in view of the discussion which follows.

A tire design begins with a rectangular area into which the tire half-section must fit (see FIGS. 16 and 17). This rectangular area is represented by the equatorial plane at one side, the section-width dimension at the opposite side, a base-line parallel to the tire's axis of rotation and positioned from it a radial distance equal to the nominal diameter of the design rim for the tire, and an upper line parallel to the axis of rotation and representing the outside diameter of the tire as specified by the tire and rim association whose standards are being applied. The section width also is governed by such standards. With this dimensional "box", which also defines the tire's aspect ratio, the design proceeds.

The tread radius or radii are drawn into the rectangle; the tire bead, with its laminate layers included, is drawn in place; and a point immediately above the center of the bead's annular tensile member and perpendicular to the design-rim flange is located. This point may be given a radial coordinate dimension of Rb and an axial coordinate dimension Yb which represents distance from the equatorial plane. A second point, having coordinates designated as Rs and Ys, similarly is selected. This point is in the shoulder region of the tire, typically is on the carcass neutral line, and is located somewhat axially inward of the lateral edge of the belt structure. The edge of the belt structure typically is slightly axially inward of the tread's lateral edge, such edge being determined by the tread width, which is to be regarded as being in the range from 65% to 80% of the tire's section width.

After the two points (Rb, Yb) and (Rs, Ys) have been selected, the tire designer generates a curve between these two points and a radial line through a third point (Rm, Ym), which represents the location of the carcass neutral line adjacent the location at which the inflated tire is to have its maximum section width. The curve drawn typically represents the "natural" contour for a radial carcass ply passing through the three points; the calculation of the contour ignores the fact that the radial ply tire is to have a belt structure restricting its carcass contour or shape in the region between the two shoulder points of the tire. Thus, the tire's carcass ply or plies are given a contour natural for a radial tire in the sidewall region between the bead and shoulder points mentioned above.

According to one of the aspects of the present invention, the radial carcass plies also are given a natural contour between the shoulder points (Rs, Ys) and (Rs', Ys') located on the respective opposite sides of the tire. This natural contour of the radial carcass ply under the tread region approximates the contour that an unrestricted tire carcass ply, having a cord angle equivalent to that or those in the circumferentially restrictive working plies or layers in the belt structure (preferably a cord angle or angles less than the critical angle of about 25°) would take in such region between the shoulder points. Such contour is a reverse or concave outwardly curvature centered about the equatorial plane. One or more of the cord layers or plies of the belt structure also may be given such reverse curvature over at least a portion of their axial width.

FIG. 16 is a schematic illustration of the tire previously described in connection with FIG. 4. The primed numerals represent items that are symmetrical to those illustrated on the right of the equatorial plane EP.

It may be seen that the rim 201 has a diameter 203 that is parallel to the axis of the tire and represents the bottom of the "rectangular box" in which the tire 200 is made to fit. The section width is defined by the lines 204, 204', and the outside diameter of the tire is indicated by line 205. Lines 206, 206' represent the maximum width of the neutral line of the radial carcass ply or plies 220, which extend between points (Rb, Yb) and (Rs, Ys), as shown at 270 (and on the opposite side of the tire at 270'). In the preferred form of the invention, the carcass plies 270, 270' have natural shape for the angle of the cords in the carcass in the region between these points. Near the points (Rs, Ys) and (Rs', Ys'), which are the approximate points at which stresses in the radial carcass ply 220 are transferred through the elastomeric materials of the tire to the circumferentially restrictive belt structure 230, the contour of the radial carcass begins to form a reverse curvature. This reverse curvature in the illustrated tire is produced by the wedge 260 positioned between the carcass ply and the belt structure 230, the plies of which are generally concentric with the surface of the tread 240 over at least 80% of the respective axial widths of such plies. Thus, the carcass ply, although radial, takes on the reverse curvature generally predicted by the Purdy equation for a ply that is unrestricted and has a cord angle less than the critical angle of about 25°. (In connection with FIG. 16, it should be noted that line 206 is axially inward of line 204 to allow for the thickness of the sidewall rubber in the tire.)

FIG. 17 is a schematic representation of a tire following the aspect of the invention described in association with FIG. 12 and has primed numerals to designate those items symmetrically corresponding to the items positioned to the right of equatorial plane EP. The tire of FIG. 17 again is bounded by a rectangular box including rim diameter 403, outer diameter 405, and a section width defined by lines 404, 404'. Lines 406 and 406' represent the respective maximum outer dimensions of the radial carcass ply, and the points of significance in the reverse curvature of the radial carcass ply in the crown or undertread region of the tire are indicated by numerals 421, 422 and 423 and their primed equivalents. The carcass maximum radial dimensions are at points 421 and 421', minimum radial dimension at 422 (the equatorial plane), and inflection points occur at 423 and 423'. It should be noted that the carcass in the aspect of the invention illustrated in FIG. 17 has "radial" cord angles in its two plies that are in the range from 65° to 80° for the reasons described in connection with FIG. 12. The preferred aspect ratio range is between 40% and 65%.

The wedge 460 may be an integral part of the tread or undertread elastomer and is positioned above both the "radial" carcass plies and the belt plies 431, 432, which have cord angles below the critical angle of about 24° and comprise the belt structure 430. Also, wedge 460 (and wedge 260 in FIG. 16) may be made from an elastomeric material of different characteristics and compound than those elastomers used in the tread structure, the undertread, or as a coating on the various ply stocks. For example, a low hysteresis, high rebound rubber compound may be desirable in at least some applications.

From FIGS. 16 and 17 in particular, it may be seen that the respective wedges 260 and 460 constitute means for imparting a reverse curvature to the carcass plies and, in the FIG. 17 aspect, to the layers of the belt structure as well. In the region between the points 221 and 221' (FIG. 16) or 421 and 421' (FIG. 17), the wedges cause dimensions between the tread surface and, in FIG. 16 the belt structure as well, to decrease continually as a function of distance from the equatorial plane.

The radially outer "surfaces" of the wedges are parallel with the tread surfaces. However, the radially inner "surfaces" of wedges 260 and 460 have a shape that is initially determined by the use of a cubic equation or "spline-fit" curve which matches the radii and rate of change of radii of the "natural contour" carcass plies, near points 221,221' in FIG. 16 and 421,421' in FIG. 17. Spline-fit curves are available in computer-aided drafting programs, such as CADAM ®, and can be applied in the present context by the selection of several (preferably four) points, for example, in the FIG. 16 region near to but axially outward of Rs,Ys. An initial point 222 then is selected and a spline-fit curve between the four points is drawn. If this curve, representing a line that defines the radially inner contour of the belt structure, geometrically interferes with the belt structure, point 222 is moved radially inwardly and the process is repeated until a satisfactory carcass ply wedge contour is found.

Use of a cubic equation spline-fit curve between points 221, the equatorial plane and point 221' allows generation of a carcass line with smooth rate of change of radii with no discontinuities in curvature or slope. The rate of change in radii or curvature is designed to be directly proportional to the rate of change of circumferential restrictive capability of the belt plies, as employed in the tire under consideration, progressing from the outer edge toward the equatorial plane.

This approach results in a carcass geometry generally resembling, in full profile view, a low amplitude cosine wave for tires with aspect ratios below 75%. However, the final equilibrium geometry is actually of a more complex nature and is specifically determined and confirmed through the use of a finite-element-analysis program which is able to model the effects of tire inflation on the tire profile. Thus, a finite-element-analysis computer program, such as that commercially available from the MacNeal Schwendler Corporation in the form of MSC/NASTRAN, can be used to model iteratively the shape of the elastomeric wedge until preferred carcass growth, substantially uniform and outwardly directed, is achieved.

It was mentioned previously that the aspect ratio of the tire is important as to the benefits to be derived from the invention. The 75% aspect ratio tire illustrated in FIG. 12 is a limiting case because problems with tire footprints are generally much less likely to occur at higher aspect ratios. At higher aspect ratios the reverse curvature of the carcass may be slight. However, due to the effect of the convex tread, a reverse curvature will appear in the carcass when the inflated tire is deflected. As aspect ratio decreases to the range of 65% and below, the reverse curvature of the carcass becomes more and more desirable. The portion of the "radial" carcass over which its shape should be governed, not by its "radial" cord angle but instead by the cord angle of the overlying belt structure, increases; at the same time, the Purdy curves defining "natural shape" for the "radial" sidewalls of the tire become more restricted from their natural aspect ratio of about 110%. Also, as aspect ratio decreases into the preferred range from 40% to 65%, and if the same load capacity is assumed, the greater will be the difference in the region of reverse curvature between the maximum radial dimensions to the carcass and the minimum radial dimension that occurs at the equatorial plane. This difference will be at least as great as the thickness of a carcass ply.

Based upon the foregoing description of the invention, what is claimed is:

1. A radial-ply pneumatic tire for use on paved surfaces, the tire comprising a carcass having at least one radial ply, a belt structure radially outward of and circumferentially surrounding the carcass to provide circumferential restriction of the carcass shape and a tire tread having a width in the range from 65% to 80% of the tire's maximum section width, the tire having an elastomeric wedge radially interposed between the carcass and the belt structure for imparting a reverse curvature to the radial carcass ply when the tire is mounted on its design rim and normally inflated such that the tire when mounted on its design rim and undeflected undergoes uniform growth in the radial dimensions as measured from the tire's axis of rotation of its tread surface when its inflation pressure is increased from atmospheric pressure to normal pressure, the radial displacement laterally across the tread surface being uniform within plus or minus 25% of the radial displacement of the tread surface at the equatorial plane, the reverse curvature being in a region between two points in the tire profile centered about and on opposite sides of the equatorial plane, the respective points being located at maximum radial dimensions of the carcass ply on the respective sides of the equatorial plane, the points of maximum radial dimension being respectively located axially inwardly of both the lateral edges of the belt structure and the centers of annular tensile members located in beads of the tire, dimensions between the carcass and the belt structure continually decreasing as a function of axial distance from the equatorial plane in the region between the two points, the radially innermost ply of the belt structure having a cord angle in the range from 17° to 27° with respect to the equatorial plane and being in contact with the radially outer surfaces of the wedge, the tire having an aspect ratio less than or equal to 75%.

2. A radial-ply tire according to claim 1 wherein the wedge has a surface contour defined approximately by a cosine function.

3. A radial-ply tire according to claim 1 wherein the wedge has a thickness at the equatorial plane less than or equal to 5% of its width in the axial direction.

4. A radial-ply tire according to claim 2 wherein the wedge has a thickness at the equatorial plane less than or equal to 5% of its width in the axial direction.

5. A radial-ply tire according to claim 3 wherein the tire carcass consists of a single ply of steel cord extending between the beads of the tire and wherein the belt structure consists of at least four plies, the radially innermost ply of the belt structure having either a single part or having two parts separated from one another and spaced from the equatorial plane of the tire thereby to form a split-belt ply, wherein the radially outermost ply of the belt structure is narrower than the belt plies between the radially innermost ply and such radially outermost belt ply, and wherein the belt plies between the radially outermost ply and the radially innermost ply have angles oppositely directed with respect to the equatorial plane of the tire, the cord angles in such belt plies being in the range from 18° to 21° with respect to the equatorial plane.

6. A radial-ply tire according to claim 3 wherein, when the tire is normally inflated on its design rim, planes parallel to the equatorial plane of the tire pass simultaneously through the annular tensile members of the respective beads of the tire and through the axially outermost edges of one of the two layers of the belt structure located between the radially outermost belt ply and the radially innermost ply of such structure.

7. A radial-ply tire according to claim 3 wherein the carcass consists of one or two plies of polyester cords extending between the annular tensile members of the respective beads of the tire, and wherein the belt structure consists of two plies, either with or without overlay plies of cords at substantially zero-degree cord angle, the two plies of the belt structure being of different widths and being formed from cords of steel or aromatic polyamide, such cords being oriented at angles with respect to the equatorial plane of the tire in the range from 18° to 25°.

8. A radial-ply tire according to claim 5 wherein the plies of the belt structure between the radially outermost ply and the radially innermost ply have curvatures concentric with the tread radius or radii over at least 80 percent of the respective axial widths of such plies.

9. A radial-ply tire according to claim 7 wherein the two plies of the reinforcing belt structure have curvatures concentric with the curvature of the tread surface over at least 80 percent of the respective axial widths of such belt plies.

10. A radial-ply pneumatic tire for use on paved surfaces, the tire comprising a carcass having at least two plies, a belt structure radially outward of and circumferentially surrounding the carcass to provide circumferential restriction of the carcass shape and a tire tread having a width in the range of 65% to 80% of the tire's maximum section width, the tire having elastomeric wedge for imparting a reverse curvature to both the belt structure and the carcass plies when the tire is mounted on its design rim and normally inflated such that the tire when mounted on its design rim and undeflected undergoes uniform growth in the radial dimensions as measured from the tire's axis of rotation of its tread surface when its inflation pressure is increased from atmospheric pressure to normal pressure, the radial displacement laterally across the tread surface being uniform within plus or minus 25% of the radial displacement of the tread surface at the equatorial plane, the reverse curvature being in a region between two points in the tire profile centered about and on opposite sides of the equatorial plane, the respective points being located at maximum radial dimensions of the carcass ply on their respective sides of the equatorial plane, the points of maximum radial dimension being respectively located axially inwardly of both the lateral edges of the belt structure and the centers of annular tensile members in beads of the tire, and radial dimensions between the tread surface and the carcass ply continuously decreasing as a function of axial distance from the equatorial plane in the region between the two points, the plies of the belt structure having cord angles less than 25°, with respect to the equatorial plane, the radial cords of two carcass plies having cord angles respectively right and left in the range from 65° to 80°, the tire having an aspect ratio less than or equal to 75%.

11. A radial-ply tire according to claim 10 wherein the carcass plies are limited to two, both of which have polyester cords, and wherein the belt structure has plies of steel or aromatic polyamide cord with cord angles in the range from 17° to 25° with respect to the equatorial plane, and wherein the aspect ratio of the tire is in the range from 40% to 65%.

12. A radial-ply tire according to claim 10 wherein the wedge for imparting the reverse curvature comprises a wedge of elastomeric material having one defining surface following the curve of (parallel to) the tread surface and having a second defining surface causing dimensions between the tread surface and the carcass to decrease continually as a function of axial distance from the equatorial plane in the region between the two points in the tire profile.

13. A radial-ply tire according to any of claims 1 through 4 wherein the carcass has only two plies respectively having right and left cord angles in the range from 65° to 80°.

* * * * *